United States Patent
Kodaka et al.

(10) Patent No.: US 7,664,990 B2
(45) Date of Patent: Feb. 16, 2010

(54) METHOD AND APPARATUS FOR TESTING WEB APPLICATION, AND COMPUTER PRODUCT

(75) Inventors: Toshihiro Kodaka, Kawasaki (JP); Rieko Yamamoto, Kawasaki (JP); Tadahiro Uehara, Kawasaki (JP); Asako Katayama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 474 days.

(21) Appl. No.: 11/799,024

(22) Filed: Apr. 30, 2007

(65) Prior Publication Data
US 2008/0109680 A1 May 8, 2008

(30) Foreign Application Priority Data
Oct. 30, 2006 (JP) .............................. 2006-294502

(51) Int. Cl.
*G06F 11/00* (2006.01)
(52) U.S. Cl. ......................................... 714/38; 717/124
(58) Field of Classification Search ................... 714/38; 717/124
See application file for complete search history.

(56) References Cited

U.S. PATENT DOCUMENTS

| | | | |
|---|---|---|---|
| 6,434,513 B1 * | 8/2002 | Sherman et al. | 702/186 |
| 6,449,744 B1 * | 9/2002 | Hansen | 714/738 |
| 2003/0115185 A1 * | 6/2003 | Byers | 707/3 |
| 2005/0086643 A1 * | 4/2005 | Shane | 717/124 |
| 2007/0245315 A1 * | 10/2007 | Koike | 717/124 |
| 2007/0277154 A1 * | 11/2007 | Badwe | 717/124 |
| 2008/0072100 A1 * | 3/2008 | Okada | 714/28 |
| 2008/0109680 A1 * | 5/2008 | Kodaka et al. | 714/38 |
| 2009/0055801 A1 * | 2/2009 | Kodaka et al. | 717/124 |
| 2009/0125976 A1 * | 5/2009 | Wassermann et al. | 726/1 |

OTHER PUBLICATIONS

"Jakarta Cactus," (online) http://jakarta.apache.org/cactus, last update Mar. 26, 2006. pp. 1-2.
HttpUnit (online) http://httpunit.sourceforge.net/, p. 1.

* cited by examiner

*Primary Examiner*—Emerson C Puente
(74) *Attorney, Agent, or Firm*—Greer, Burns & Crain, Ltd.

(57) ABSTRACT

A computer-readable recording medium that stores therein a web application testing program causing a computer to execute receiving a request including an input value to be given to web application software installed in a web server; executing the web application software by giving the input value to the web application software; obtaining test information to be used in a test of an output item that is obtained by executing the web application software; generating a response to the request, the response in which the test information is embedded in association with the output item; and transmitting the response to a computer that executes the test of the output item.

20 Claims, 17 Drawing Sheets

FIG.3

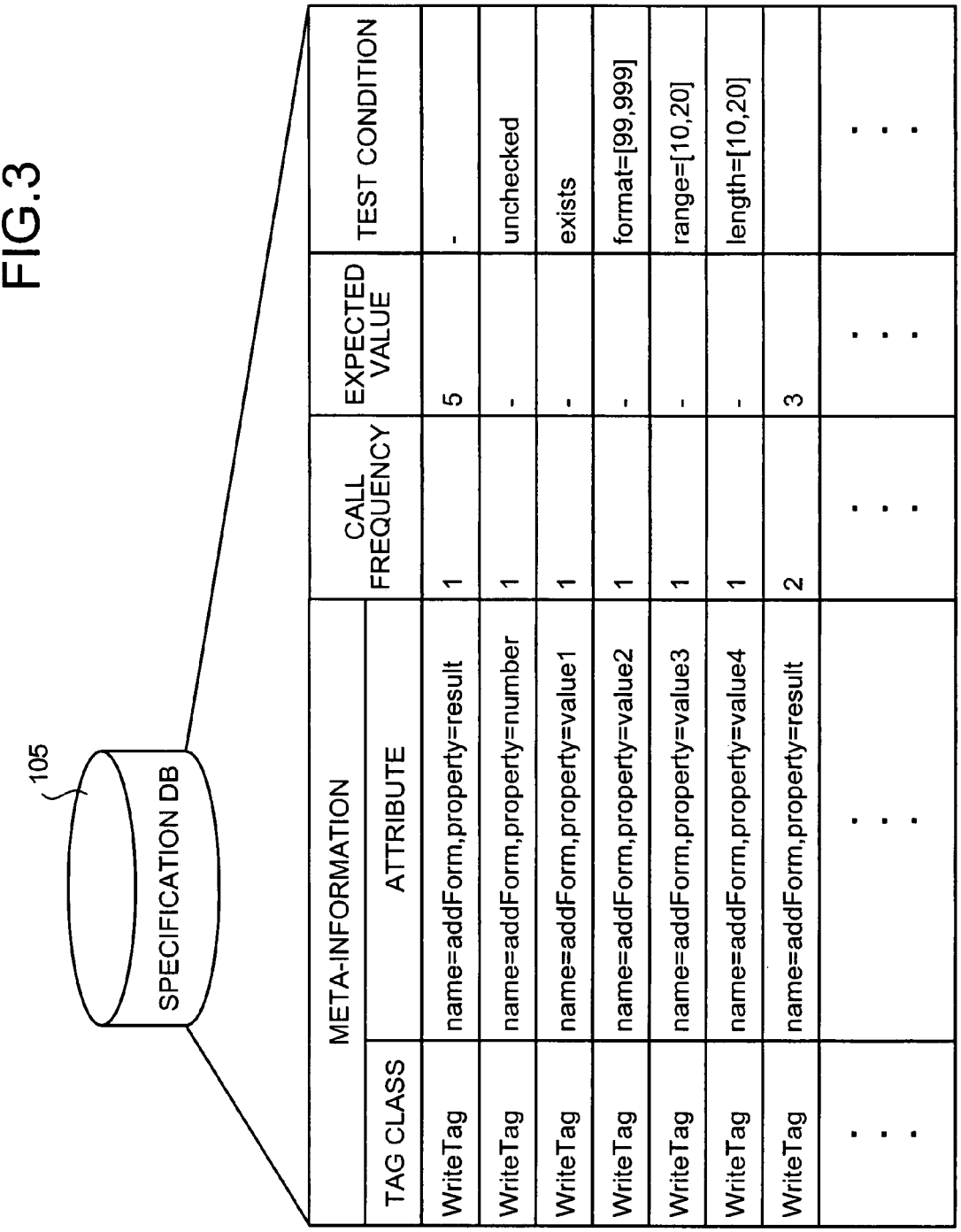

| TAG CLASS | META-INFORMATION ATTRIBUTE | CALL FREQUENCY | EXPECTED VALUE | TEST CONDITION |
|---|---|---|---|---|
| WriteTag | name=addForm,property=result | 1 | 5 | - |
| WriteTag | name=addForm,property=number | 1 | - | unchecked |
| WriteTag | name=addForm,property=value1 | 1 | - | exists |
| WriteTag | name=addForm,property=value2 | 1 | - | format=[99,999] |
| WriteTag | name=addForm,property=value3 | 1 | - | range=[10,20] |
| WriteTag | name=addForm,property=value4 | 1 | - | length=[10,20] |
| WriteTag | name=addForm,property=result | 2 | 3 | |
| ... | ... | ... | ... | ... |

105 SPECIFICATION DB

FIG.16

(A)
```
144  org.apache.struts.taglib.bean.WriteTag _jspx_th_be%_write_0 = (org.apache.struts.taglib.bean.WriteTag)
145    .get(org_apache_struts_taglib_bean_WriteTag_class);
146  _jspx_th_bean_write_0.setPageContext(_jspx_page_context);
147  _jspx_th_bean_write_0.setParent((javax.servlet.jsp.tagext.Tag) _jspx_th_html_html_0);
148  _jspx_th_bean_write_0.setName("AddForm");
149  _jspx_th_bean_write_0.setProperty("result");
150  int _jspx_eval_bean_write_0 = _jspx_th_bean_write_0.doStartTag();
151  if (_jspx_th_bean_write_0.doEndTag() == javax.servlet.jsp.tagext.Tag.SKIP_PAGE) {
152    _jspx_tagPool_bean_write_property_name_nobody.reuse(_jspx_th_bean_write_0);
153    return true;
154  }
```
— 903 class="WriteTag" — 1001
name="AddForm" — 1002
property="result" — 1003

(B)
```
1  <html>
2  <head><title>Result</title></head>
3  <br><br>
4  <body>
5  <p>The result is <!--testStart class="WriteTag"--><!-- testEnd --></p>
6  </body>
7  </html>
```
— 920

<!-- testStart class="WriteTag" --> — 1601
<!-- testEnd --> — 1602

(C)
```
1  <html>
2  <head><title>Result</title></head>
3  <br><br>
4  <body>
5  <p>The result is <!--testStart expected="5"-->5<!-- testEnd --></p>
6  </body>
7  </html>
```
— 910

<!-- testStart expected="5" --> — 911
<!-- testEnd --> — 912
— 701

METHOD AND APPARATUS FOR TESTING WEB APPLICATION, AND COMPUTER PRODUCT

CROSS-REFERENCE TO RELATED APPLICATIONS

This application is based upon and claims the benefit of priority from the prior Japanese Patent Application No. 2006-294502, filed on Oct. 30, 2006, the entire contents of which are incorporated herein by reference.

BACKGROUND OF THE INVENTION

1. Field of the Invention

The present invention relates to a technology of an automatic test of web application software conducted in developing a web application system.

2. Description of the Related Art

Conventionally, a test on web application software has been carried out by such a method that a tester visually checks output items while operating a web browser, or writes a testing program and checks output response to an input request in the program.

In the method by such visual check, the tester writes down processes to execute, input values, and expected values in a test specification, and manually enters the input values one by one according to the test specification to execute the processes. The tester determines on whether the test is successful or unsuccessful by visually comparing an output result displayed on a screen with an expected value written in the test specification. Usually, the test specification includes no description of a place on the screen where the output result is displayed. The tester, therefore, specifies the place of result display by his or her own judgment.

Meanwhile, a method combining the techniques disclosed in Jakarta Cactus, [online] searched on Oct. 10, 2006, Internet <URL: http://jakarta.apache.org/cactus>) and Httpunit, [online] searched Oct. 10, 2006, Internet <URL: http://httpunit.sourceforge.net/>) has been widely known as a method using a testing program. According to this method, a tester makes a hyper text transfer protocol (HTTP) request following rules specified at each tool, and sends the request to a web server provided with web application software. The web server sends an HTTP response, which is a result of processing by the web application software, back to the tester that then determines on whether the test is successful or unsuccessful by analyzing the HTTP response in the testing program.

This method using the testing program has an advantage that the same tests can be automatically conducted once the testing program has been written. In carrying out a regression test, where a test once conducted is conducted again, a method in which a the test is automatically carried out at re-execution in such a way that an HTTP response received at the first test is recorded in a log format and an HTTP response obtained at the retest is checked with the recorded log.

Although the above method by the visual check makes writing of a test specification relatively easy, the method invites a risk of overlooking a difference between an output result and an expected value when they do not match because of dependency on manual operation. For example, the tester may have a difficulty in quickly finding the location of the output result on the screen and spend much time to identify the location, and may even fail to recognize the actual output place of the result.

Besides, when the method by the visual check is employed for a regression test requiring repetition of the same tests, greater manpower is required for each execution of the test. This leads to less efficiency and longer period of the test.

In the above method using a testing program, identifying the position of appearance of an output item, which is a test subject, on an HTTP response is even more difficult than the case of the method by the visual check.

If position information on an output item is written precisely in a testing program to facilitate visual check, a small design change results in a necessity of rewriting the testing program, thereby increasing costs in modification of a specification.

When a bug is found in a testing program itself, what matters is the reliability of the test. At present, however, no means for proving a test to be bug-free has been suggested.

In addition, the above method of automatic re-execution of a test through log recording, which is employed for a regression test, etc., cannot be achieved completely automatically, unless an HTTP response at the first test and that at the retest match exactly, except the header.

For example, when web application software includes an output item changing its contents at every test, such as "reception date", a change in the item contents causes inconsistency between a response at a retest and a response log from the first test. As a result, a test result is considered to be unsuccessful.

SUMMARY OF THE INVENTION

It is an object of the present invention to at least solve the above problems in the conventional technologies.

A computer-readable recording medium according to one aspect of the present invention stores therein a web application testing program. The web application testing program causes a computer to execute receiving a request including an input value to be given to web application software installed in a web server; executing the web application software by giving the input value to the web application software; obtaining test information to be used in a test of an output item that is obtained by executing the web application software; generating a response to the request, the response in which the test information is embedded in association with the output item; and transmitting the response to a computer that executes the test of the output item.

A computer-readable recording medium according to another aspect of the present invention stores there in a web application testing program. The web application testing program causes a computer to execute receiving a response to a request when web application software installed in a web server is executed in response to the request, the response in which an output item obtained by execution of the web application software is associated with test information to be used in a test of the output item; testing the output item based on the test information in the response; and outputting a result obtained as a result of the testing in association with the output item.

A computer-readable recording medium according to still another aspect of the present invention stores therein a web application testing program. The web application testing program causes a computer to execute receiving a response to a request when web application software installed in a web server is executed in response to a request, the response in which an output item obtained by executing the web application software with meta-information on execution of the web application software; obtaining test information associated with the meta-information in the response from a group of test information, each piece of which is associated with meta-information on each execution of the web application software; testing the output item in the response based on the obtained test information; and outputting a result obtained as a result of the testing, in association with the output item.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a schematic of a specification database (DB) according to the embodiment;

FIG. 16 is an explanatory view (2) of the execution process of the web server on testing according to the second embodiment.

DETAILED DESCRIPTION OF THE PREFERRED EMBODIMENTS

Exemplary embodiments according to the present invention will be described in detail with reference to the accompanying drawings. Commonalties between a first embodiment and a second embodiment will first be described.

Figure 1:
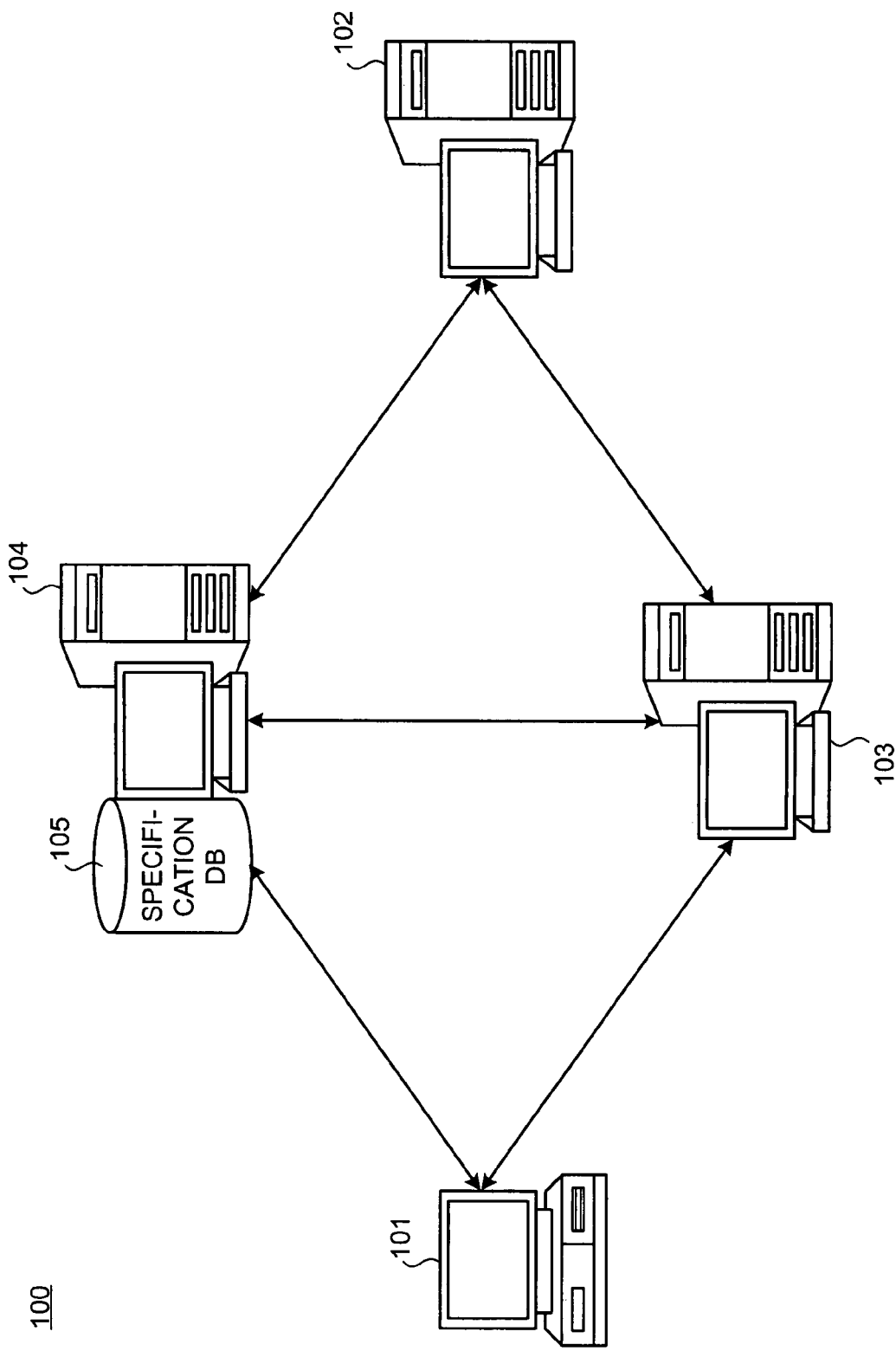
FIG. 1 is a schematic for illustrating an outline of a web application test system according to an embodiment of the present invention.

The outline configuration of a web application test system according to an embodiment of the present invention will be described. FIG. 1 is a schematic for illustrating an outline of the web application test system according to the embodiment of the present invention.

The web application test system 100 includes a client 101, a web server 102, a proxy server 103, and an administrative server 104, which are interconnected via a network, such as the Internet, to be capable of communicating with each other. The web server 102, the proxy server 103, and the administrative server 104 may be integrated into a single unit of server, or any two of those servers may be integrated into a single server.

The client 101 is a computer used by a tester. The client 101 accesses the web server 102, sends a request to the web server.102, the request containing an input value to be given to web application software in the web server 102, and receives a response to the request from the web server 102. The client 101 is capable of putting out the response on a display.

The web server 102 is a computer in which the web application software to be tested is installed. The web server 102 provides the client 101 with service according to the web application software through execution of the web application software. A test on the web application software may be conducted on the web server 102.

The proxy server 103 is a computer that relays data exchanged between the client 101 and the web server 102. The test on the web application software may be conducted on the proxy server 103. When the proxy server 103 does not have a web application software test function, or an administrative function and a specification DB of the administrative server 104, the proxy server 103 may be removed from the web application test system 100.

The administrative server 104 is a computer that administrates the contents of specification of the web application software. The administrative server 104 has a specification DB 105, which is the data base storing specification information in the form of electronic data consisting of meta-information, call frequencies, expected values, and test conditions.

The administrative server 104 extracts a requested expected value and/or test condition from the specification DB 105, using meta-information sent from an information requesting party (e.g., web server 102, proxy server 103, or client 101) as a key to the extraction, and sends the extracted information to the requesting party. The administrative function of the administrative server 104 and the specification DB 105 may be incorporated into the web server 102 or into the proxy server 103.

Figure 2:
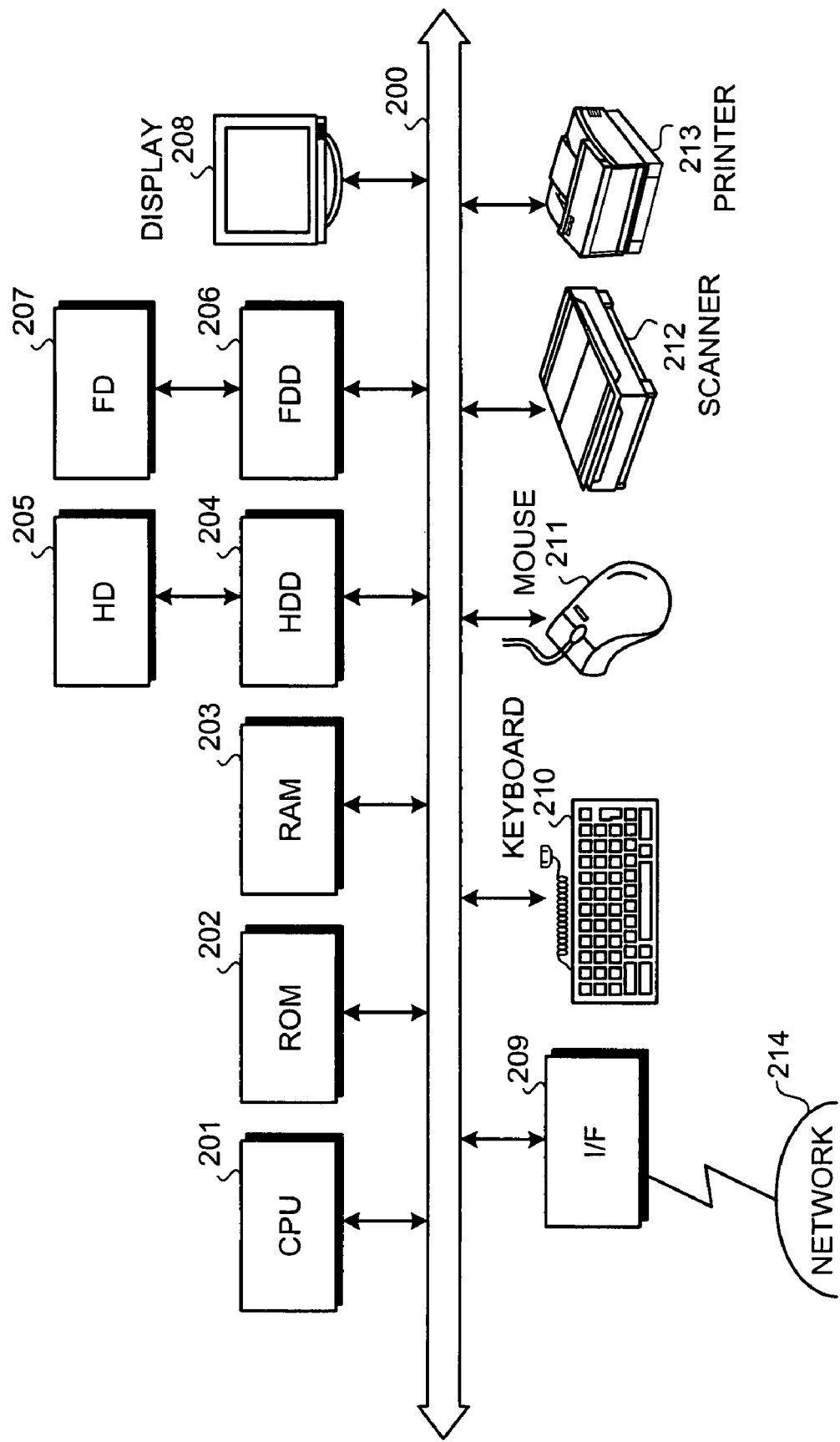
FIG. 2 is a schematic illustrating a hardware configuration of computers shown in FIG. 1.

FIG. 2 is a schematic illustrating a hardware configuration of the computers shown in FIG. 1. As shown in FIG. 2, each computer includes a central processing unit (CPU) 201, a read-only memory (ROM) 202, a random access memory (RAM) 203, a hard disk drive (HDD) 204, a hard disk (HD) 205, a flexible disk drive (FDD) 206, a flexible disk (FD) 207, which is an instance of a removable recording medium, a display 208, an interface (I/F) 209, a keyboard 210, a mouse 211, a scanner 212, and a printer 213. These components are interconnected via a bus 200.

The CPU 201 controls the entire part of the computer. The ROM 202 stores programs including a boot program. The RAM 203 is used as a work area of the CPU 201. The HDD 204 follows a control by the CPU 201 to control reading/writing of data from/to the HD 205. The HD 205 stores data written thereon under the control of the HDD 204.

The FDD 206 follows a control by the CPU 201 to control reading/writing data from/to the FD 207. The FD 207 stores data written thereon under a control by the FDD 206, and allows the computer to read data stored in the FD 207.

The FD 207 serving as a removable recording medium may be replaced with a compact disc read-only memory (CD-ROM), a compact disc recordable (CD-R), a compact disc rewritable (CD-RW), a magneto optical (MO) disk, a digital versatile disk (DVD), a memory card, etc. The display 208 displays a cursor, icons, tool boxes, and other data of documents, images, and functional information. For example, a cathode ray tube (CRT), a thin-film transistor (TFT) crystal display, or a plasma display can be employed as the display 208.

The I/F 209 is connected to a network-214, such as the Internet, via a communication line, and is connected to an external device via the network 214. The I/F 209 controls interfaces with the network 214 to control data input/output from/to the external device. For example, a modem or a local area network (LAN) adaptor can be employed as the I/F 209.

The keyboard 210 has keys for entering characters, numerals, various instructions, etc., serving for data input. The keyboard 210 may be replaced with a touch-panel-type input pad or a numeric keypad. The mouse 211 is used to move a cursor, select a range, move a window, change a window size, etc. The mouse 211 may be replaced with another pointing device having the same function as the mouse 211, such as a track ball and a joy stick.

The scanner 212 optically reads an image, and captures the image into the computer. The scanner 212 may be provided with an optical character recognition (OCR) function. The printer 213 prints out image data or document data. For example, a laser printer or an ink jet printer can be employed as the printer 213.

FIG. 3 is a schematic of the specification DB 105. The contents stored in the specification DB 105 are made in advance according to the specification.

The specification DB 105 stores meta-information, call frequencies, expected values, and test conditions that are associated with each other. Meta-information is the information including a tag class and an attribute thereof. A tag class means a class to which a tag of the web application software belongs. An attribute is the detailed information of a tag class, including the attribute name (name) and attribute value (property) of the tag belonging to the tag class.

An expected value is a value that is expected to be output when a tag specified by meta-information consisting of a tag class, attribute name, and attribute value is executed. A test condition is a condition that is referred to when a test process on an output value specified by a tag is executed.

For example, a test condition "unchecked" means no execution of a test process. A test condition "exists" means execution of only the test to check the presence/absence of any character string, which is taken to be an output item. The detail of the character string is not subjected to the test. A test condition "format" means execution of only the test on format information of a character string, which is tanked to be an output item. A test condition "range" means a test on the range of a numerical value represented by a character string, which is taken to be an output item. A test condition "length" means a test on the range of a character string length, which is an output item. In addition, a test on the type of characters (kanji, kana, katakana, alphabet, full-size character, single-space character) etc., may also be provided as a test condition.

Introduction of such test conditions allows a clear description that a test is not conducted on an uncertain value changing at every test. In addition, the value presence test, format test, and range test allow execution of a test of the minimum requirement on an uncertain value, which enables a more quality test as a whole. Hereinafter, expected value and/or test condition will be called "test information". The specification DB 105 exerts its function, for example, through the recording media shown in FIG. 2, such as the ROM 202, the RAM 203, and the HD 205.

Figure 4:
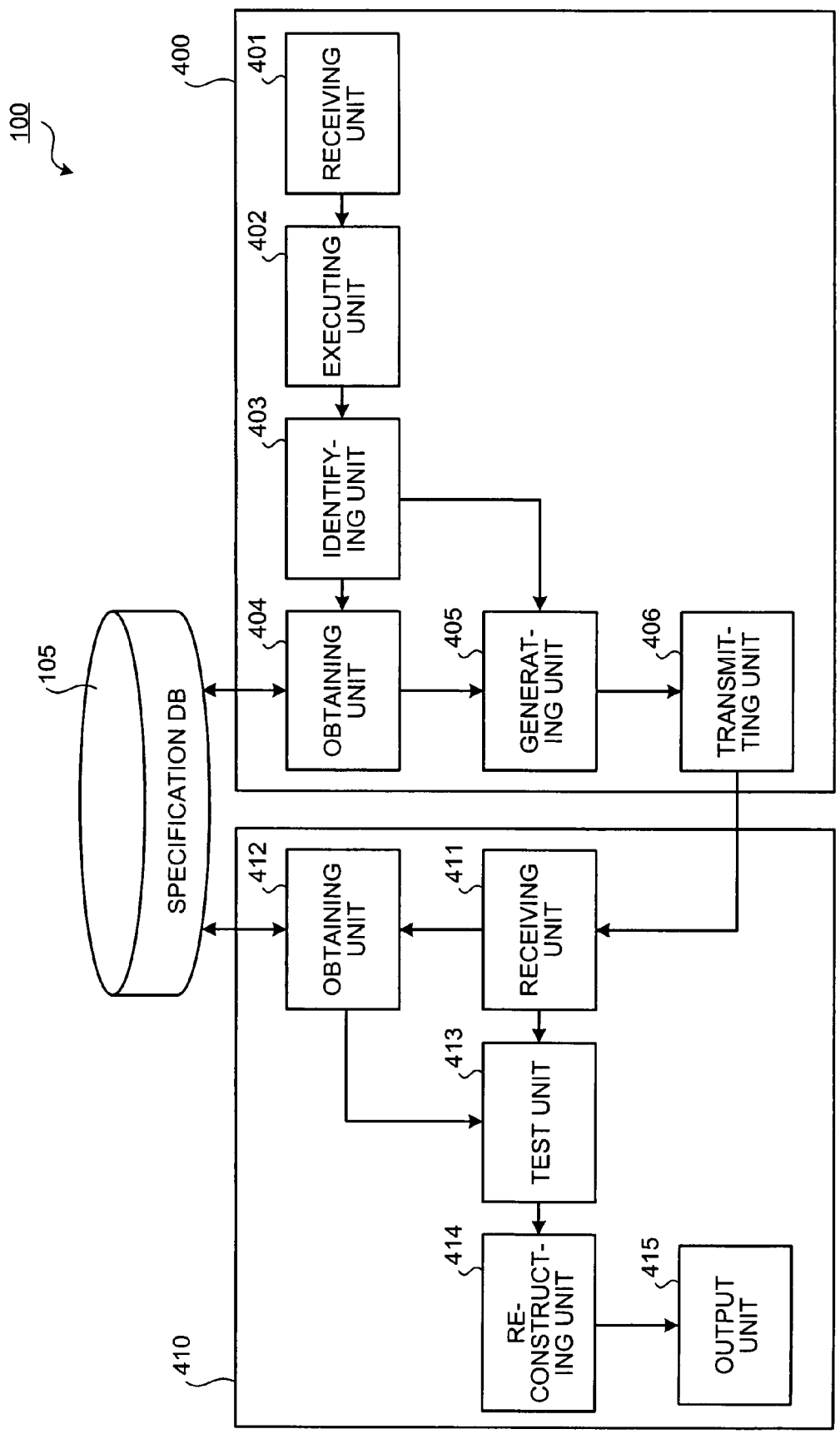
FIG. 4 is a block diagram of the web application test system.

FIG. 4 is a block diagram of the web application test system 100.

In the web application test system 100 shown in FIG. 4, a reference numeral 400 denotes the computer having the web application software installed therein. This computer represents, for example, the web server. A reference numeral 410 denotes the computer that tests the web application software. The computer 410 represents, for example, the web server 102, the proxy server 103, the administrative server 104, or the client 101.

The computer 400 includes a receiving unit 401, an executing unit 402, an identifying unit 403, an obtaining unit 404, a generating unit 405, and a transmitting unit 406. Functions of these units are realized by the CPU 201 executing programs recorded in such recording media such as the ROM 202, the RAM 203, and the HD 205, or by the I/F 209.

The receiving unit 401 has a function of receiving a request including a request for an input value given to the web application software installed in the web server 102. Specifically, the receiving unit 401 receives a request including a request for the uniform resource locator (URL) and directory that specifies the location of the web application software, and an input value, such as input data, put into an input space on a web page. The way of receiving a request varies. The request may be entered by operating such an input unit as the keyboard 210 of the computer 400, or the request from the client 101 may be received as the request is sent from the client 101 by operating such an input unit as keyboard 210 of the client 101.

The executing unit 402 has a function of giving the web application software an input value included in a request received by the receiving unit 401 to execute the application software. A calculation result from the web application software is called an output item. The web application software is programmed so as to automatically determine the output position of an output item upon execution of the web application software. Output position means the display position of output item that is determined when the output item is displayed on the screen according to an interpretation of a response to a request.

The identifying unit 403 has a function of identifying meta-information on the contents of execution of the web application software by the executing unit 402. Specifically, for example, when a certain process is executed, the identifying unit 403 identifies a description indicating a tag class and a tag class attribute related to the process from information consisting of the execution contents of the web application software expressed in source codes.

The obtaining unit 404 has a function of obtaining test information (expected value, test condition) from the specification DB 105, using meta-information identified by the identifying unit 403 as a key to the test information. The obtaining unit 404 extracts the test information directly from the specification DB 105 when the computer 400 includes the specification DB 105. The obtaining unit 404, on the other hand, sends a request for the test information including meta-information to an external server (e.g., administrative server 104) having the specification DB 105 when the computer 400 does not include the specification DB 105, receiving the test information sent from the external server to obtain the test information.

The generating unit 405 generates a response to a request received by the receiving unit 401. Specifically, when test information is obtained, the generating unit 405 generates the response to the request so that the test information is associated to an output item in the response. When meta-information is identified but the test information for the meta-information is not obtained, the generating unit 405 generates the response to the request in which the meta-information and the output item are associated meta-information in the response.

Specifically, test information and meta-information associated with the output position of an output item is embedded in a response so that the test information and meta-information is displayed on the display screen together with the output item. For example, when the response is generated in a HTML format, the test information and meta-information is described as an HTML comment on the output item. This allows display of the test information and meta-information together with the output item. A response including test information is called "test-information-attached response", and a response including meta-information is called "meta-information-attached response".

The transmitting unit 406 transmits a response generated by the generating unit 405 to the computer 410 that conducts a test on an output item. Thus, test information and meta-information, which is necessary for the test, is transmitted to the computer 410 along with the output item to be tested.

As described above, the computer 400 transmits a test-information-attached response to another computer to allow the computer to conduct the test without obtaining a test condition for an output item. The computer 400 also transmits a meta-information-attached response to another computer to allow the computer to identify meta-information and obtain test information for the output item. This enables sharing of process load between the computer 400 and the computer receiving the responses.

The computer 410 includes a receiving unit 411, an obtaining unit 412, a testing unit 413, a reconstructing unit 414, and an output unit 415. Functions of these units are realized by the CPU 201 executing programs recorded in such recording media such as the ROM 202, the RAM 203, and the HD 205, or by the I/F 209.

The receiving unit 411 has a function of receiving a response sent from the computer 400. Specifically, the receiving unit 411 receives a test-information-attached response or a meta-information-attached response, which is sent from the computer 400.

The obtaining unit 412 has a function of obtaining test information (expected value, test condition) from the specification DB 105, using meta-information from a received response as a key to the test information when the meta-information-attached response is received. The obtaining unit 412 extracts the test information directly from the specification DB 105 when the computer 410 includes the specification DB 105. The obtaining unit 410, on the other hand, sends a request for the test information including meta-information to an external server (e.g., administrative server 104) having the specification DB 105 when the computer 410 does not include the specification DB 105, receiving the test information sent from the external server to obtain the test information.

The testing unit 413 has a function of conducting a test on an output item on the basis of test information. Specifically, for example, when the test information is an expected value written in the specification of the web application software, the testing unit 413 determines on whether the output item matches the expected value. The testing unit 413 outputs a message indicating "pass" when the output item matches the expected value, while outputs a message indicating "fail" when the output item does not match the expected value. Each message is output as a test result.

When the test information is a test condition to be satisfied by the output item, which test condition is written in the specification of the web application software, the testing unit 413 determines on whether the output item complies with the test condition. The testing unit 413 outputs a message indicating "pass" when the output item complies with the test condition, while outputs a message indicating "fail" when the output item fails to comply with the test condition. Each message is output as a test result.

For example, when the test condition is "exist", which is information on the presence/absence of the output item, the testing unit 413 outputs a message of "pass" as a test result when the output item is present, while outputs a message of "fail" as a test result when the output item is not present. The test results may be output in contrary to the above manner in such a way that a message of failure is output when the output item is present, while a message of "pass" is output when the output item is not present.

When the test condition is "format", which is limiting information on the format of the output item, the testing unit 413 outputs a message of "pass" as a test result when the output item complies with the test condition, while outputs a message of "fail" as a test result when the output item fails to comply with the test condition. For example, when the test condition is "insert a comma in an output item of an uncertain numerical value of four digits or more", the output item of a five-digit uncertain numerical value expressed as "12345" fails to comply with the test condition, and is determined to be failure in the test, while the same numerical value expressed as "12, 345" is in compliance with the test condition, and is determined to be passed the test.

When the test condition is "range", which is limiting information on the range of a numerical value that is the output item, the testing unit 413 outputs a message of "pass" as a test result when the output item complies with the test condition, while outputs a message of "fail" as a test result when the output item fails to comply with the test condition. For example, when the test condition is "output item is a numerical value of four digits or less", the output item of an uncertain numerical value of "12345" fails to comply with the test condition, and is determined to be failure in the test, while the numerical value of "1234" is in compliance with the test condition, and is determined to be passed the test.

When the test condition is "length", which is limiting information on the length of a character string that is the output item, the testing unit 413 outputs a message of "pass" as a test result when the output item complies with the test condition, while outputs a message of failure as a test result when the output item fails to comply with the test condition. For example, when the test condition is "output item is a character string consisting of four or less characters", the output item of a character string of "abcde" fails to comply with the test condition, and is determined to be failure in the test, while a character string of "abcd" is in compliance with the test condition, and is determined to be passed the test.

When the test condition is "unchecked", which is information meaning no execution of the test on the output item, the testing unit 413 does not,execute the test. In this case, a message informing of no execution of the test is output as a test result.

The reconstructing unit 414 has a function of reconstructing a received response according to a test result. Specifically, for example, the reconstructing unit 414 reconstructs the description contents of the response by adding a test result of a pass/fail message, which is added as frame information, to the response.

When a meta-information-attached response from the computer 400 is received, the reconstructing unit 414 may replace meta-information embedded in the meta-information-attached response with test information to embed the test information in the response. This allows the computer 410, which now actually receives the reconstructed response, to display the source codes of the response and checks the test information.

The output unit 415 has a function of linking a test result from the testing unit 413 to an output item and of outputting the linked test result. Specifically, when displaying a response on the computer 410, the output unit 415 displays a response reconstructed by the reconstructing unit 414 on the display screen. This response contains the output item, so that the output item is displayed on the display screen. When the test result of a pass/fail message is added to the response as frame information, the output unit 415 displays a message indicating "pass" or "fail" on the same or another display screen.

The output unit 415 may transmit the reconstructed response to a computer different from the computer 410, for example, to a computer (e.g., client 101) sending a request to the computer 400 (e.g., web server 102). In this case, the output item and its test result of the pass/fail message are displayed on the client 101.

As described above, the computer 410 is capable of automatic execution of the test on an output item. In addition, the computer 410 links a test result to an output item to allow the output item and its test result to be displayed simultaneously on a computer to which a response is sent. This facilitates check work carried out by the tester. Also, the computer 410 embeds test information in the response in replacement of meta-information and displays the source codes of the response. This allows a visual check on whether the output item has passed the test.

The first and the second embodiments of the web application testing program, the recording medium recording the program, the web application testing apparatus, and the web application testing method will now be described in detail. The same components and parts as described in the above embodiments will be denoted by the same reference numerals, and will not be described further.

According to the first embodiment, the web server 102 carries out a test information obtaining process and an aspect injecting process, and the proxy server 103 carries out a test process. In other words, according to the first embodiment, the web server 102 serves mainly as the computer 400 shown in FIG. 4, and the proxy-server 103 serves mainly as the computer 410.

Figure 5:
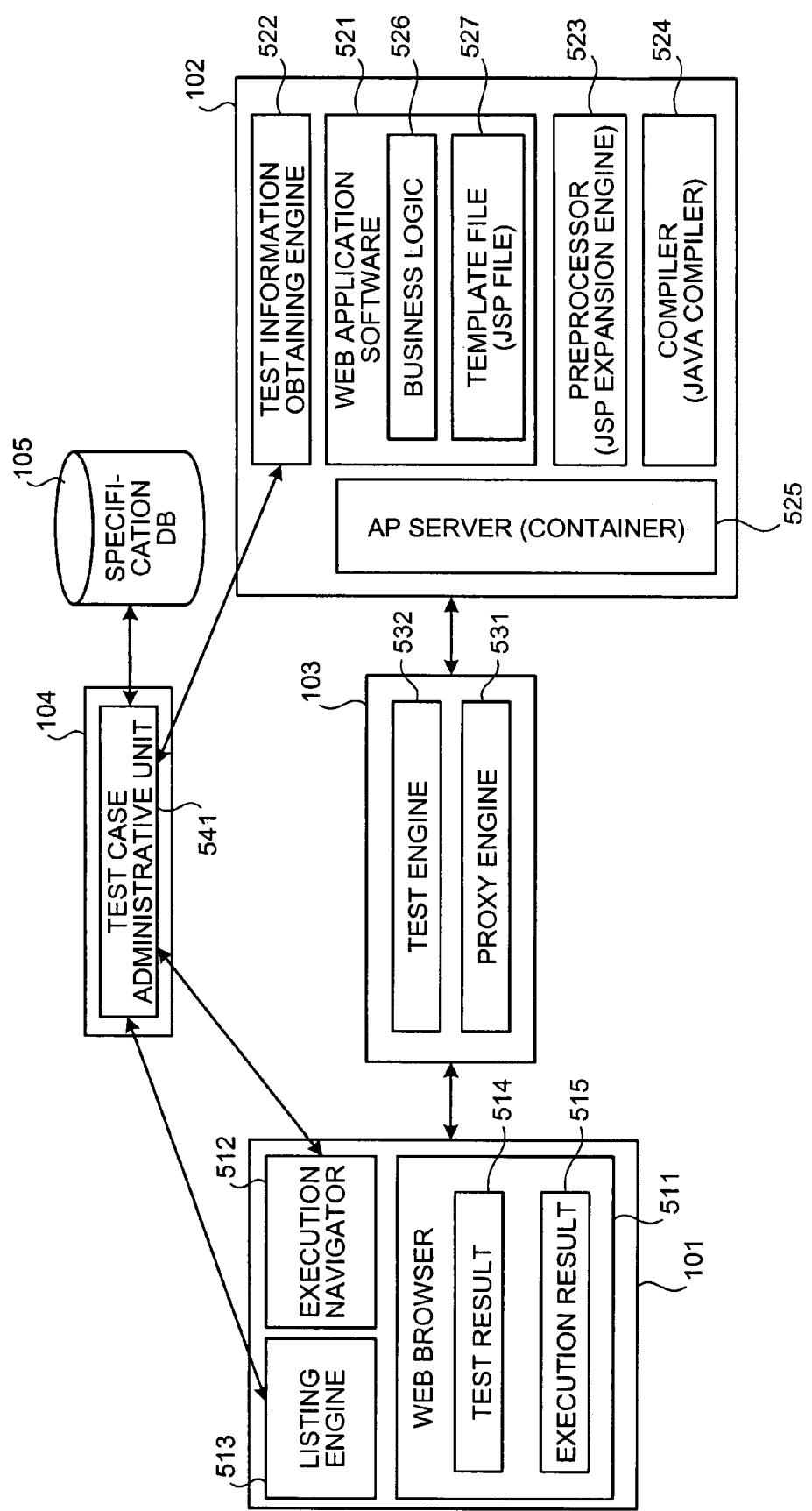
FIG. 5 is a block diagram of an internal configuration of each computer shown in FIG. 1 according to a first embodiment of the present invention.

FIG. 5 is a block diagram of the internal configuration of each computer shown in FIG. 1 according to the first embodiment. The internal configuration of the client 101 will first be described. As shown in FIG. 5, the client 101 includes a web browser 511, an execution navigator 512, and a listing engine 513.

The web browser 511 is a program that has a communication function of generating and transmitting an HTTP request to web application software 521 of the web server 102 and receiving an HTML format response (hereinafter, "response HTML") from the web server 102 or the proxy server 103, an analyzing function of analyzing the received response HTML, and a graphic function of graphically expressing a result of the analysis on a display. Graphic expression contents are divided into a test result 514 and an execution result 515 from the web application software 521.

The execution navigator 512 is a program that is installed to obtain the next operation to execute from the administrative server 104 and display the next operation on the screen. The listing engine 513 is a program that is installed to display an expected value for an output item that is displayed on the screen by the execution navigator 512.

The web server 102 includes the web application software 521, a test information obtaining engine 522, a preprocessor 523, a compiler 524, and an AP (application) server 525. The AP server 525 is a program providing the web application software 521 with an execution environment, which the AP server 525 has the preprocessor 523, and the compiler 524. The AP server 525 is equivalent in configuration to the receiving unit 401, generating unit 405, and transmitting unit 406 shown in FIG. 4.

When Java server pages (JSP) and Java (registered trademark) language method, an industrial standard presented by U.S. Sun Microsystems, is employed, a JSP expansion engine can be used as the preprocessor 523, and a JAVA compiler can be used as the compiler 524.

The web application software 521, which is the test subject, is installed in the AP server 525. The web application software 521 is made up of a business logic 526, and a template file 527. The business logic 526 is a logic description of the web application software 521 for executing operation processes for business transaction, etc. The logic description dictates each type of an operation flow, such as "check the inventory when a customer puts an article in the shopping bag" and "check with a credit firm for authentication when a transmission button is pressed".

The template file 527 is the file that defines a screen design and the display position of an output item. A JSP file can be used as the template file 527 when JAVA (registered trademark) is employed.

In the course of development of the web application software 521 in recent years, separating a design function from a function of the business logic 526 has become a popular method. This gives the web application software 521 an operational structure that an output item processed in the business logic 526 is displayed at a location specified by a custom tag in the JSP file 527. The web application software 521, the business logic 526, and the template file (JSP file) 527 are equivalent in configuration to the executing unit 402 and the identifying unit 403 shown in FIG. 4.

The test information obtaining engine 522 is a program installed to obtain test information from the administrative server 104. Specifically, the test information obtaining engine 522 sends a tag class and meta-information to the administrative server 104 to obtain test information extracted from the specification DB 105. The test information obtaining engine 522 is written, for example, in an aspect-oriented programming language, such as AspectJ. The test information obtaining engine 522 is equivalent in configuration to the obtaining unit 404 shown in FIG. 4.

The internal configuration of the proxy server 103 will then be described. The proxy server 103 includes a proxy engine 531, and a test engine 532. The proxy engine 531 has a function of providing access between the client 101 and the web server 102 in proxy operation.

The test engine 532 has a function of testing to check whether the web application software 521 is running normally based on test information and an output value embedded in a test-information-attached response HTML 910, which is sent from the web server 102. The test engine 532 delivers a test result 514 to the proxy engine 531.

For example, the test engine 532 determines on whether an expected value matches the output value when the expected value is included in the test information, and determines on whether the output value matches a test condition when the test condition is included in the test information. The proxy engine 531 is equivalent in configuration to the receiving unit 411 and the output unit 415 shown in FIG. 4, and the test engine 532 is equivalent in configuration to the obtaining unit 412, the test unit 413, and the reconstructing unit 414.

The internal configuration of the administrative server 104 will then be described. The administrative server 104 includes a test case administrative unit 541, which is a program installed to administrate test cases executed by a tester. Specifically, the administrative server 104 links a URL and an input value for the web server 102 to a test case in corresponding relation for every test case, transmitting the corresponding URL and input value for the web server 102 to the client 101 when the client 101 specifies a test case.

As described above, the test case administrative unit 541 extracts a requested expected value from the specification DB 105, using a tag class and meta-information sent from a test information requesting party (e.g., web server 102, proxy server 103, or client server 101) as a key to the expected value, and sends the expected value to the requesting party. The test case administrative unit 541 is equivalent in configuration to the obtaining unit 404 shown in FIG. 4.

Figure 6:
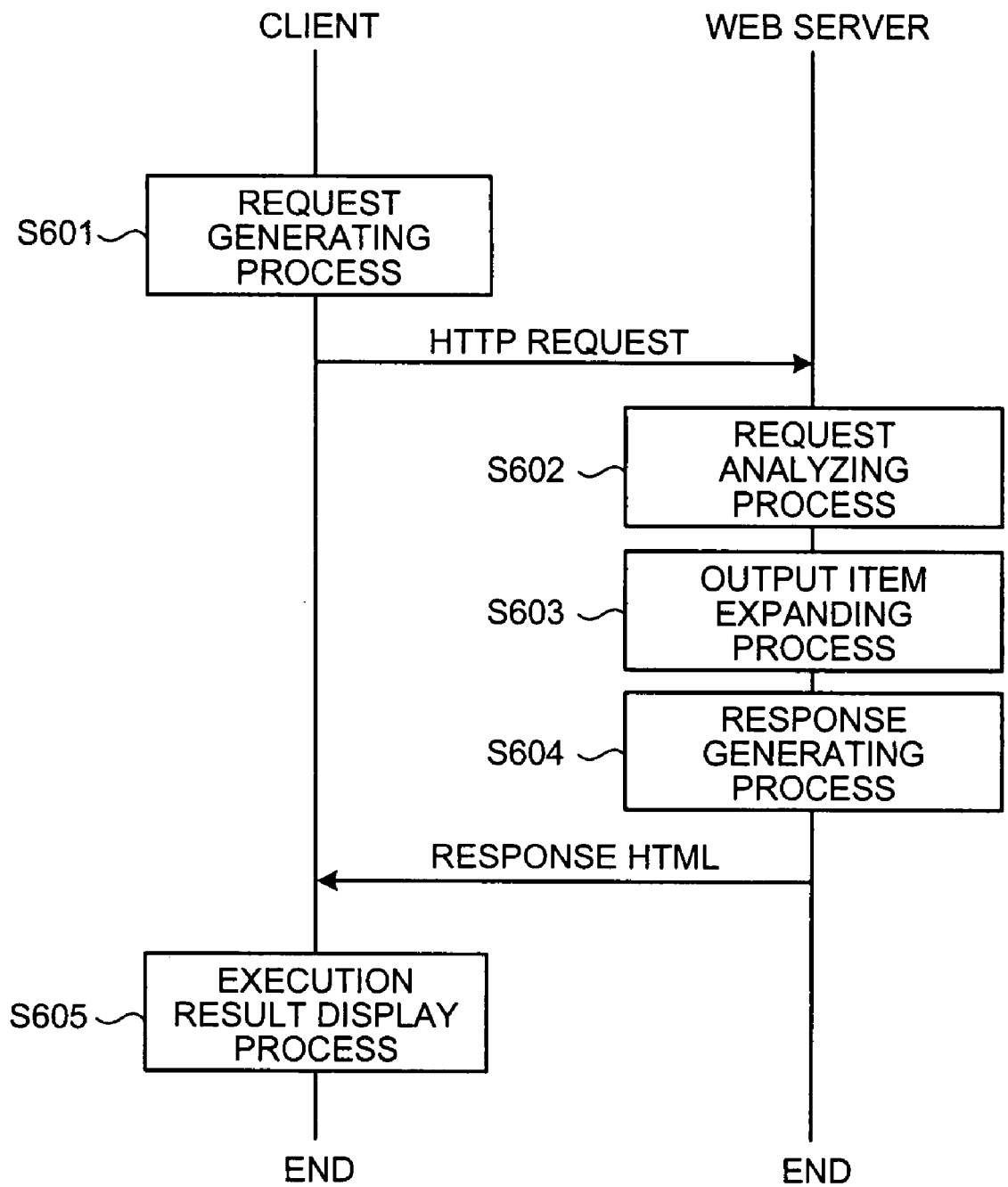
FIG. 6 is a sequence diagram of an execution process by a web server on practical operation according to the first embodiment.
Figure 7:
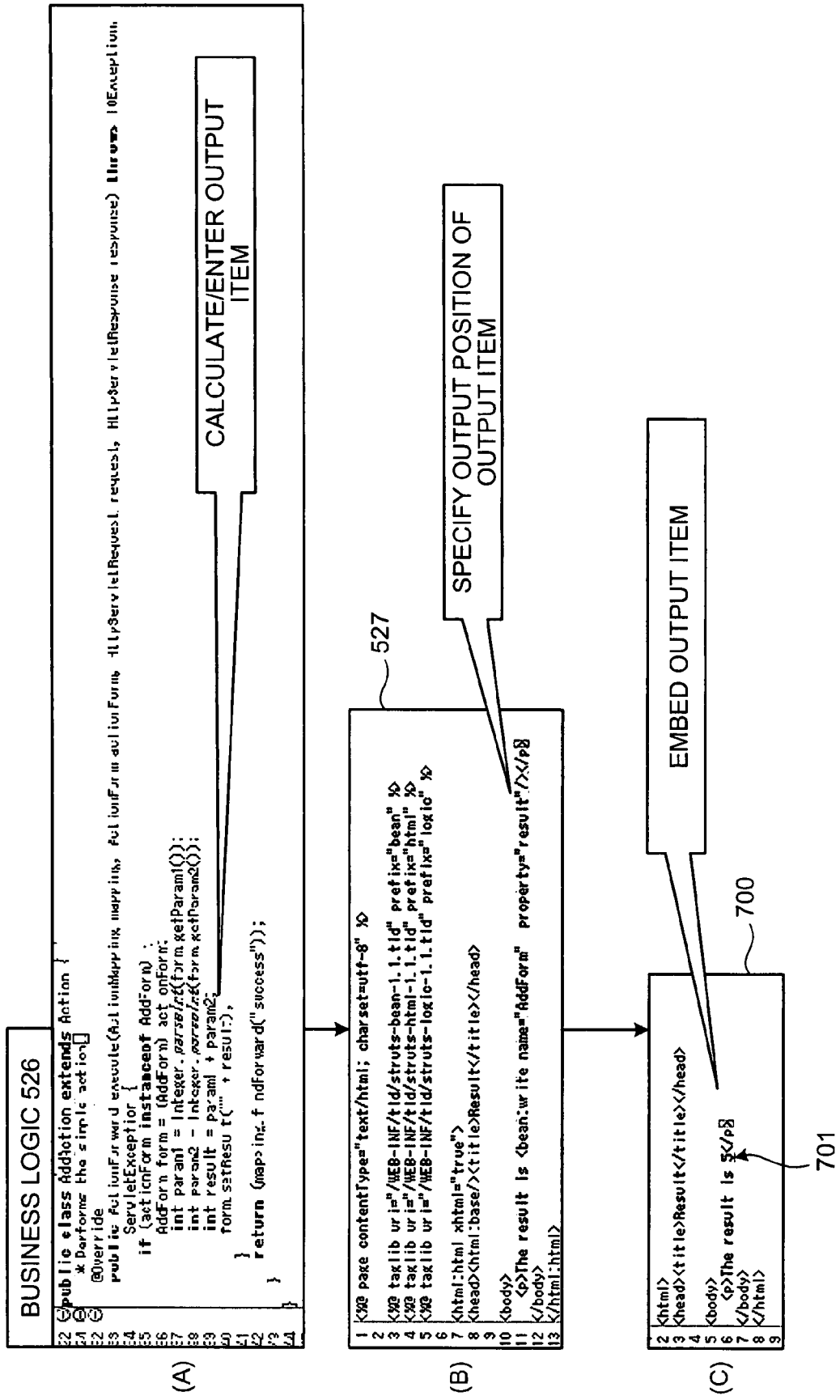
FIG. 7 is an explanatory view of the execution process by the Web server on practical operation according to the first embodiment.

FIG. 6 is a sequence diagram of the execution process by the web server 102 on practical operation according to the first embodiment. FIG. 7 is an explanatory view of the execution process by the web server 102 on practical operation according to the first embodiment. During the practical operation of the web server 102, an ordinary user, not a tester, operates the client 101.

As shown in FIG. 6, the client 101 executes first a request generating process (step S601). Specifically, the user operates the client 101 to obtain a URL and an input value for the web server 102 and to generate an HTTP request on the web browser 511. The web browser 511 then sends the HTTP request to the web server 102.

Upon receiving the HTTP request from the web browser 511, the web server 102 executes a request analyzing process on the received HTTP request (step S602). Specifically, the AP server 525 analyzes the contents of the received HTTP request (requested line, message header, entity body, etc.), and calls the business logic 526, which is a test subject. The business logic 526 analyzes the contents of the HTTP request to calculate/enter an output item to be output on the screen, as shown in (A) of FIG. 7.

The web server 102 then executes an output item expanding process (step S603). Specifically, the JSP expansion engine 523 determines the output position of the output item in the JSP file 527, as shown in (B) of FIG. 7, and then converts the JSP file 527 into source codes in which the output position of the output item is specified. The compiler 524 compiles the converted source codes into a binary file to generate a screen class file.

Subsequently, the web server 102 executes a response generating process (step S604). Specifically, the AP server 525 calls and executes the screen class file. At this time, a custom tag contained in the JSP file 527 (tag "<bean:wri.../>" shown on 11$^{th}$ line in the JSP file 527 in (B) of FIG. 7) is appreciated in the screen class file, and the business logic 526 converts the calculated output item into an output result.

As a result, the screen class file is converted into a response HTML 700 as shown in (C) of FIG. 7, and the output item 701 is embedded in the response HTML 700 to be located at the position of the custom tag. The AP server 525 transmits the response HTML 700 containing the embedded output item 701 to the browser 511 of the client 101.

Receiving the response HTML 700 sent from the web server 102, the client 101 executes an execution result display process (step S605). Specifically, the web browser 511 puts the received response HTML 700 into a graphic expression to display an execution result 515 from the web application software 521 on the screen. Even if the web application software 521 is application software having complicated transactions to produce a plurality of windows, the user is allowed to trace hyperlinks on the screen to repeat the same processes to finish the display process.

Figure 8:
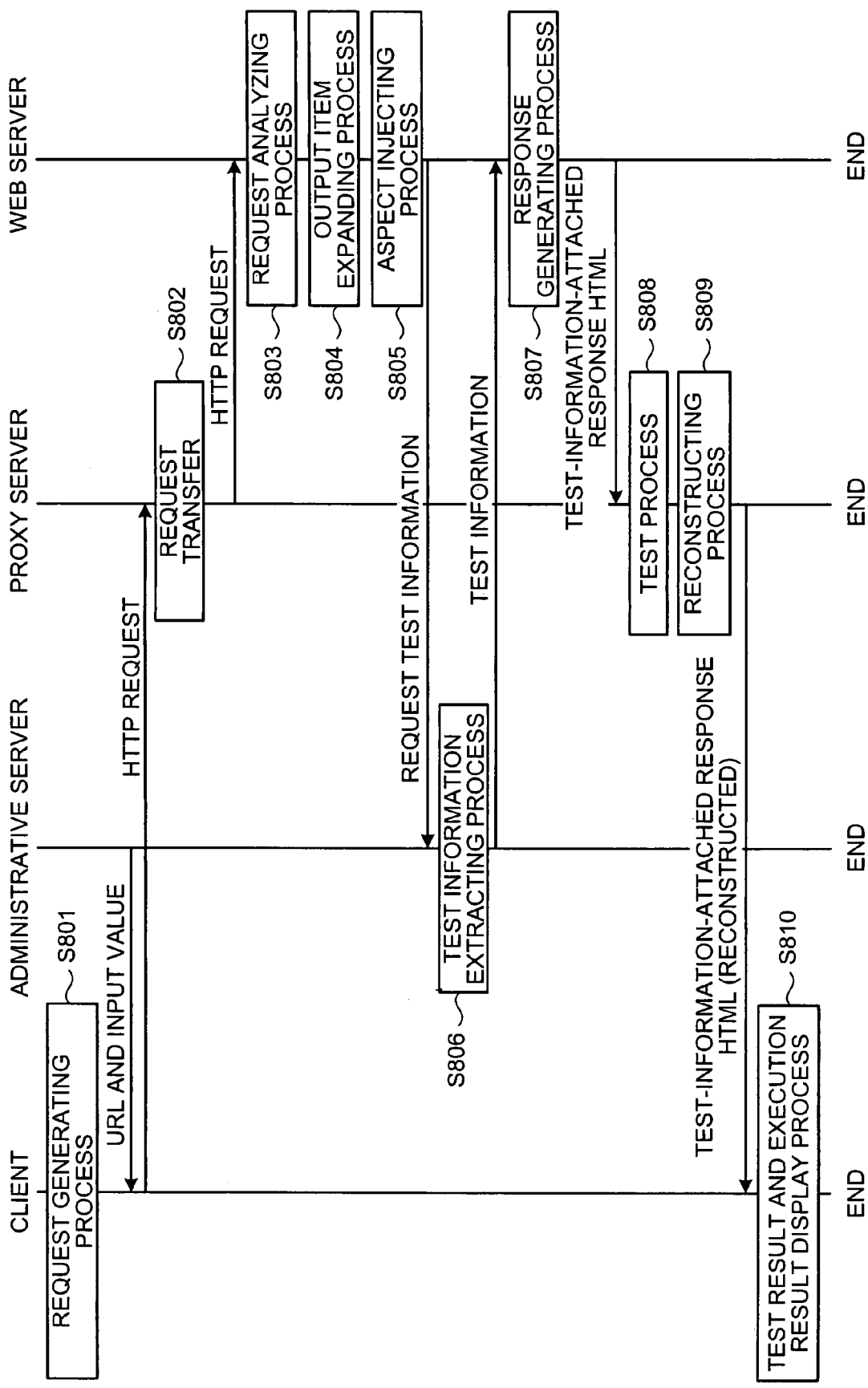
FIG. 8 is a sequence diagram of an execution process by the web server on testing according to the first embodiment.
Figure 9:
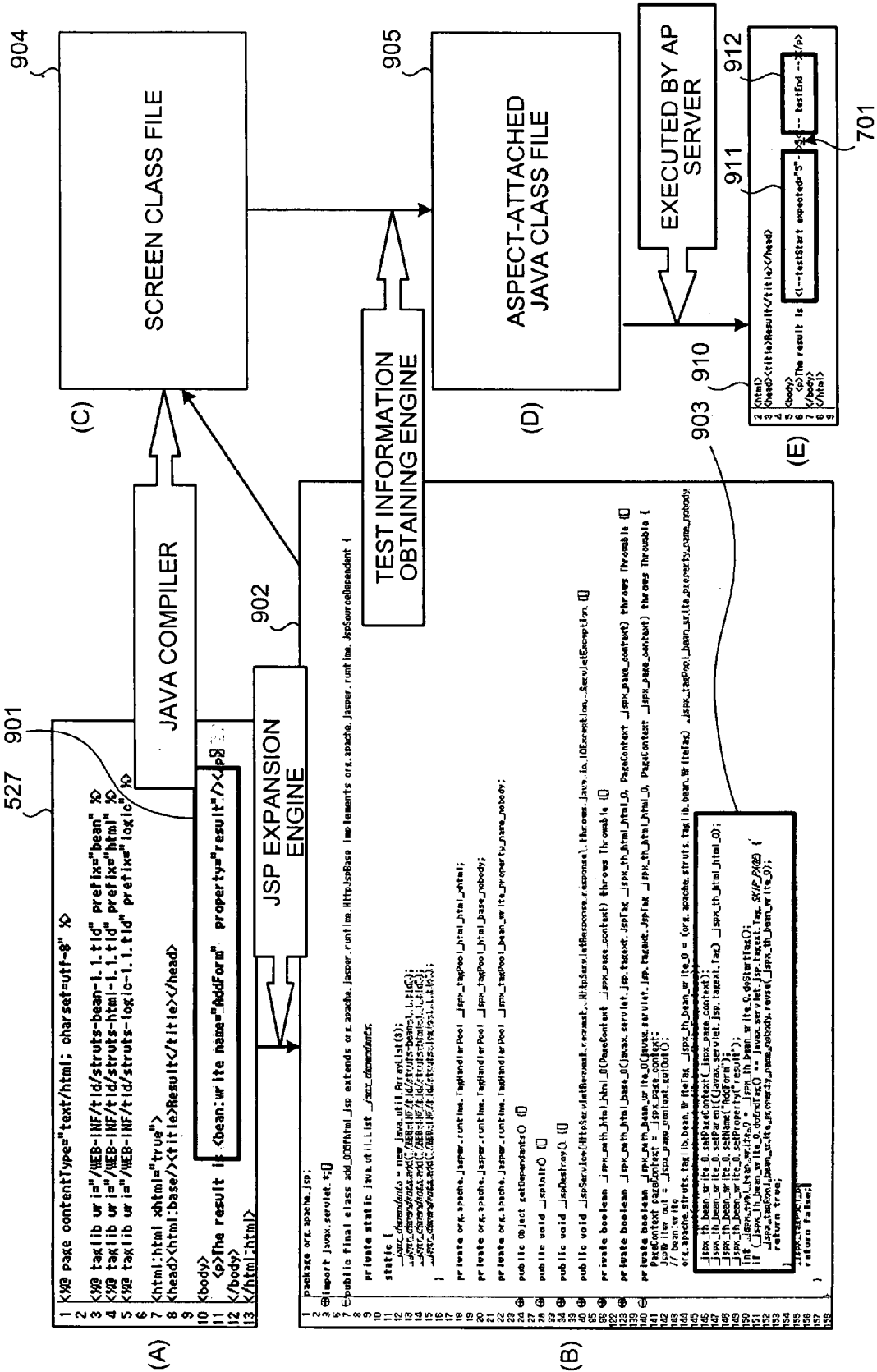
FIG. 9 is an explanatory view (1) of the execution process of the web server on testing according to the first embodiment.
Figure 10:
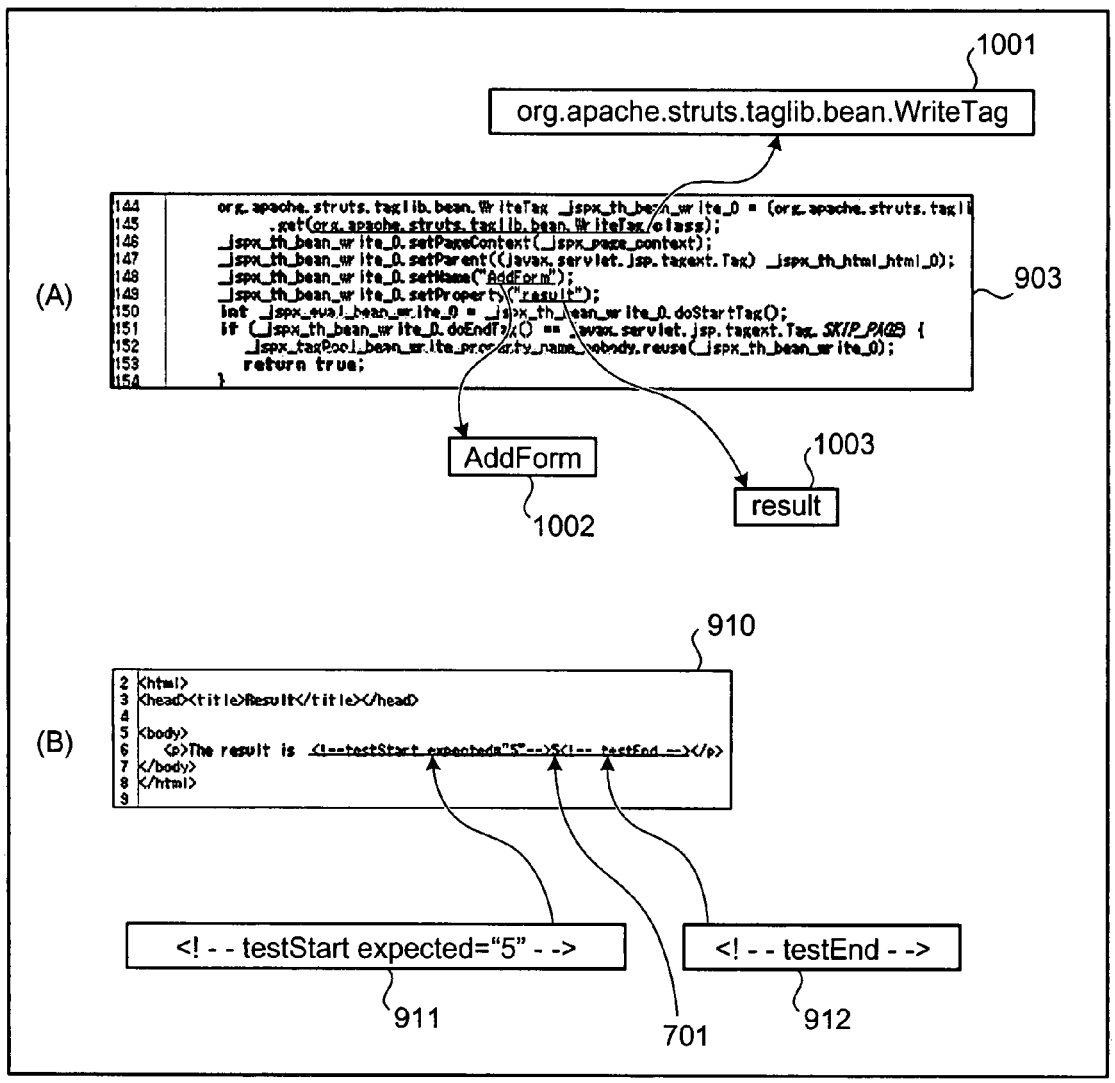
FIG. 10 is an explanatory view (2) of the execution process by the web server on testing according to the first embodiment.

The execution process contents of the web server 102 on testing according to the first embodiment will then be described for a working case where JAVA is applied. FIG. 8 is a sequence diagram of the execution process by the web server 102 on testing according to the first embodiment. FIGS. 9, 10 are explanatory views of the execution process contents of the web server 102 on testing according to the first embodiment. During the test, a tester, not an ordinary user, operates the client 101.

As shown in FIG. 8, the client 101 executes first the request generating process (step S801). Specifically, the tester operates the client 101 to cause the client 101 to request a URL and an input value for the web server 102 from the administrative server 104 and receive the URL and input value sent from the administrative server 104.

Then, the web browser 511 is operated to generate an HTTP request on the web browser 511 in the same manner as in the case of practical operation of the web server 102. The web browser 511 then sends out the HTTP request to the proxy server 103, which transfers the HTTP request to the web server 102 (step S802). The web server 102 receives the HTTP request transferred from the proxy server 103.

The web server 102 executes the request analyzing process on the received HTTP request (step S803). Specifically, the AP server 525 analyzes the contents of the received HTTP request (requested line, message header, entity body, etc.), and calls the business logic 526, which is the test subject. The business logic 526 analyzes the contents of the HTTP request to calculate the output item 701 to be output on the screen, as in the case shown in (A) of FIG. 7.

Subsequently, the web server 102 executes the output item expanding process (step S804). Specifically, the JSP expansion engine 523 determines the display position of the output item 701 in the JSP file 527, as shown in (A) of FIG. 9. The JSP expansion engine 523 then converts the JSP file 527 into source codes 902 in which the output position of the output item 701 is specified, as shown in (B) of FIG. 9. As a result of the conversion into the source codes 902, a custom tag 901 in the JSP file 527 is converted into a Java source segment 903, which is a code that calls doStartTag( ) method and doEndTag method, which correspond in class to the custom tag 901.

The compiler 524 compiles the converted source codes 902 into a binary file to generate a screen class file 904, as shown in (C) of FIG. 9. Up to this point, operation in the web server 102 is the same as in the case of practical operation.

The web server 102 then executes the aspect injection process (step S805). Specifically, the test information obtaining engine 522 requests test information from the administrative server 104. For example, the test information obtaining engine 522 extracts meta-information and sends it as a test information request to the administrative server 104, which in response extracts test information using the meta-information as a key to the test information (step S806). The administrative server 104 sends the extracted test information to the test information obtaining engine 522.

The test information obtaining engine 522 embeds the test information from the administrative server 104 in the description corresponding to the custom tag 901 (doStartTag( ) method and doEndTag( ) method) in the screen class file 904, the test information being embedded as an HTML comment, thereby converts the screen class file 904 into an aspect-attached JAVA class file 905 (aspect weaving), as shown in (D) of FIG. 9. Here, aspect weaving means a process of replacing a description of specific operation in a group of unspecified source codes 902 with another description of operation.

In this example, the custom tag 901 of the JSP file 527 is converted into the Java source segment 903 by the JSP expansion engine 523. At this time, a code that calls the doStartTag( ) method and doEndTag( ) method, which correspond in class to the custom tag 901, is generated in the Java source segment 903.

When the Java source codes 902 having such a Java source segment 903 are compiled by the Java compiler 524, the resulting screen class file 904 contains a byte code that calls the above doStartTag( ) method and doEndTag( ) method. In this case, an aspect is woven into the part corresponding to the call for the doStartTag( ) method and doEndTag( ) to replace the operation of the web application software 521 for the part with another operation defined by the aspect.

Besides, a name attribute name="addForm" and a property attribute property="result" are present in the custom tag 901. These attributes are converted into a setName( ) method and a set property method in the Java source segment 903. An aspect is woven also into these set methods, so that the name attribute name="addForm" and property attribute property="result" are accessible through the aspect-attached Java class file 905.

The test information obtaining engine 522 thus weaves an aspect into each method in the screen class file 904 to convert the class file 904 into the aspect-attached Java class file 905.

Following this, the web server 102 executes the response generating process (step S807). Specifically, the AP server 525 executes the aspect-attached Java class file 905 to generate a test-information-attached response HTML 910 shown in (E) of FIG. 9. In comparison with the response generated at the time of practical operation, the response 910 shows a feature that it contains the added HTML comment.

(A) in FIG. 10 depicts how the test-information-attached response HTML 910 is generated as a result of replacement of operation through the aspect-attached Java class file 905. When the test information obtaining engine 522 is written in an aspect-oriented programming language, such as AspectJ, the test information obtaining engine 522 and the AP server 525 generate the test-information-attached response HTML 910 by the following procedures (1) to (6).

(1) Obtain the class name of a class to which a setPageContext( ) method of the Java source segment 903 belongs. In this example, "org.apache.struts.taglib.bean.WriteTag" written on 145th line in the Java source segment 903 shown in (B) of FIG. 9 and (A) of FIG. 10 is obtained as the tag class 1001 of the custom tag 901.

(2) Extract the tag class 1001 and a setXxx method in the Java source segment 903 as an attribute list. In this example, "AddForm" written on 148th line in the Java source segment 903 shown in (B) of FIG. 9 and (A) of FIG. 10 is extracted as the attribute value 1002 of the name attribute, and "result" written on 149th line is extracted as the attribute value 1003 of the property attribute.

(3) Send the tag class 1001 and the attribute values 1002, 1003, which constitute the custom tag 901, to the test case administrative unit 541. As shown in FIG. 3, the specification DB 105 stores meta-information representing tag classes and the attribute values of name and property attributes, call frequencies, and expected values. The test case administrative unit 541 returns the meta-information from the test information obtaining engine 522 and the test information corresponding to the frequency of calls by the same tag class and attribute value, to the test information obtaining engine 522.

A call frequency is specified because of a possibility that the custom tag 901 containing the same class name and the same attribute values is called a plurality of times when such a repeating step as loop is present in the JSP file 527, and those repeated calls usually result in a change in an expected value according to the order of call.

(4) Output an HTML comment 911, which is the test information turned into an HTML comment, just before calling of the doStartTag( ) method. As a result, "<!_testStart expected="5"-->" is displayed, as shown in (E) in FIG. 9, and (B) in FIG. 10.

(5) Execute the doStartTag( ) method and doEndTag( ) method to cause the web application software 521 to run normally. As a result, an output value "5" is displayed as the output item 701 of the execution result 515, as shown in (E) in FIG. 9 and (B) in FIG. 10.

(6) Output an HTML comment 912 just after the end of execution of the doEndTag( ) method. As a result, "<!—testEnd-->" is displayed as shown in (B) in FIG. 10.

Figure 11:
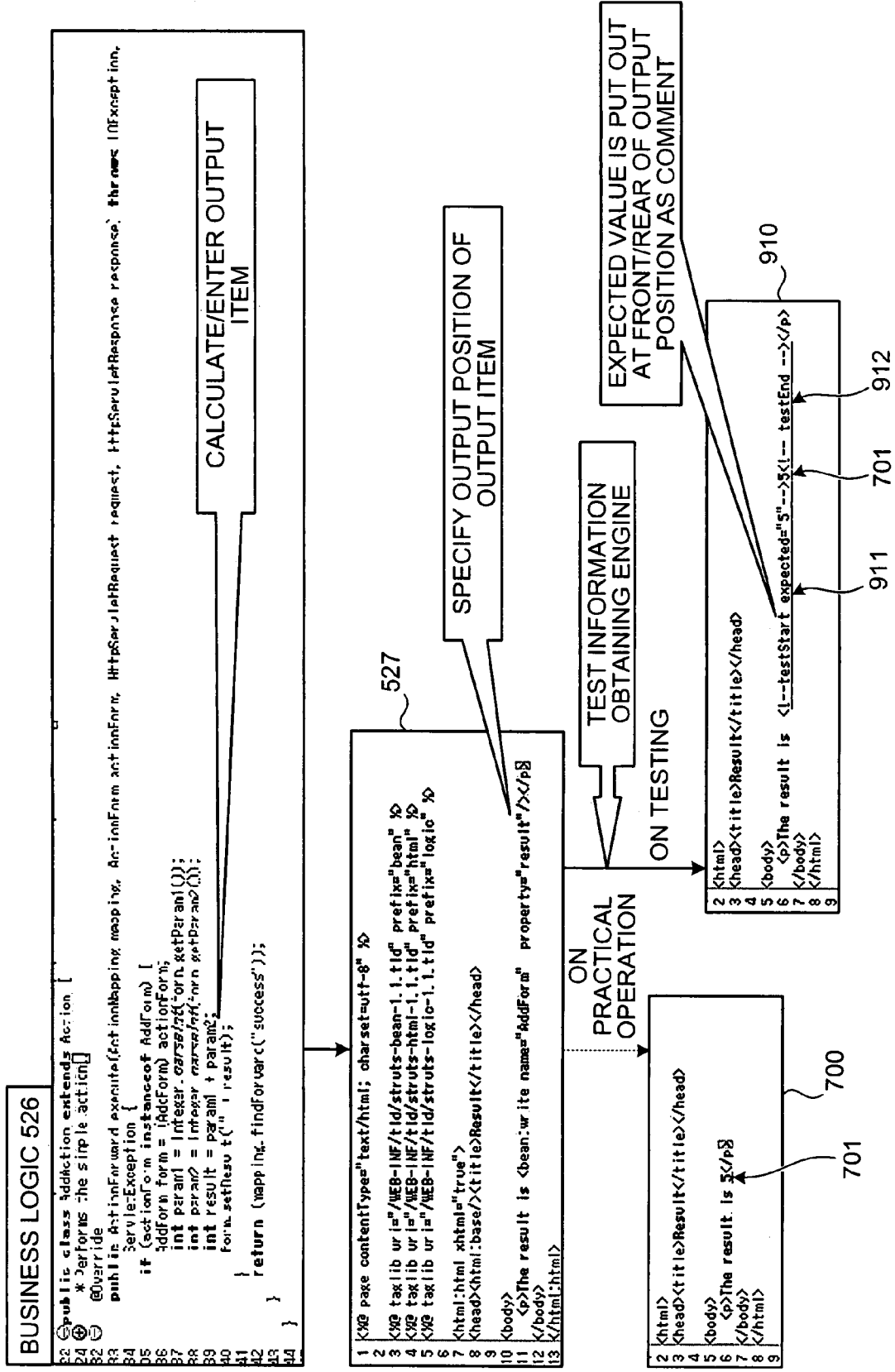
FIG. 11 is an explanatory view of an execution result from web application software according to the first embodiment.

FIG. 11 is an explanatory view of the execution result 515 from web application software 521 that is brought by the procedures (1) to (6). As shown in FIG. 11, in the test-information-attached response HTML 910, an expected value is output as the HTML comment to be located at the front and rear of the output position of the output value "5". Thus, the test-information-attached response HTML 910, instead of the response HTML 700 generated at the time of practical operation, is returned to the proxy server 103.

The proxy server 103 executes the test process (step S808). Specifically, the proxy engine 531 receives the test-information-attached response HTML 910 sent from the AP server 525, and the test engine 532 compares the expected value with the output item 701 to execute the test on the web application software 521.

The test engine 532 scans the inside of the test-information-attached response HTML 910, and searches the part enclosed between "<!testStart expected="XXX"-->" and "<!—testEnd-->". In "XXX", a character string (expected value and test condition) as test information is described. The test engine 532 then determines a character string described in the part enclosed between those tags to be the output item given as the execution result 515 from the web application software 521.

The test engine 532 conducts a test on the output item 701 based on the test information represented by the HTML comment right in front of the output item 701. For example, when an expected value is included in the test information, the test engine 532 determines whether the expected value matches the output item 701. When matching fails (mismatching), the test engine 532 stores position information, such as the number of lines, digits, and the order of the output item 701 mismatching the expected value in the test-information-attached response HTML 910.

When a test condition is included in the test information, the test engine 532 takes the test condition into account upon conducting the test on the output item 701. For example, when the test condition included in the test information is "unchecked", the test engine 532 does not execute the test process.

When the test condition included in the test information is "exists", the test engine 532 tests to only check on whether any character string is present as the output item 701. The detail of the character string is not subjected to the test. When the test condition included in the test information is "format", the test engine 532 tests to only check format information of the character string as the output item 701. For example, the test is carried out on the output item 701 to see the presence/absence of a comma behind three digits or the number of decimal digits.

When the test condition included in the test information is "range", the test engine 532 tests to check the range of a numerical value represented by the character string as the output item 701. For example, a negative number is determined to be a failure in the test. When the test condition included in the test information is "length", the test engine 532 tests to check the range of the character string length of the output item 701.

The output item 701 can be an output item giving a different result for every execution of the test, such as a slip number. According to the present embodiment, the specification DB 105 is required to contain each expected value described for every type of output item 701. The expected value for the specific output item 701 changing at every test, however, cannot be described.

To deal with this problem, therefore, the above test conditions allow a clear statement that no test is conducted on an uncertain value changing at every test. In addition, the value presence test, the format test, and the range test allow execution of a test of the minimum requirement even on an uncertain value, which enables a more quality test.

Following the test process, the proxy server 103 executes a reconstructing process (step S809). Specifically, the proxy engine 531 reconstructs the test-information-attached response HTML 910 to add frame information to the HTML description, and returns the reconstructed response HTML 910 to the web browser 511. The frame information represents frames that divide the screen into an upper portion and a lower portion.

The test result 514 is added to the test-information-attached response HTML 910 as information displayed on the upper frame. The test-information-attached response HTML 910 representing the execution result 515 from the web application software 521 is added directly to the test-information-attached response HTML 910 as information displayed on the lower frame. The proxy server 103 sends the test-information-attached response HTML 910 reconstructed in the above manner to the client 101.

Subsequently, the client 101 receives the reconstructed test-information-attached response HTML 910 sent from the proxy server 103, and executes a process of displaying the test result and execution result from the web application software 521 (step S810).

Specifically, the web browser 511 outputs the received test-information-attached response HTML 910 in the form of a graphic expression, thus displaying the test result 514 described as the upper frame and the execution result 515 described as the lower frame together on the screen. As a result, when the test result 514 is a failure, the web browser 511 can display the position information and failed class name/attribute value as the test result 514.

Figure 12:
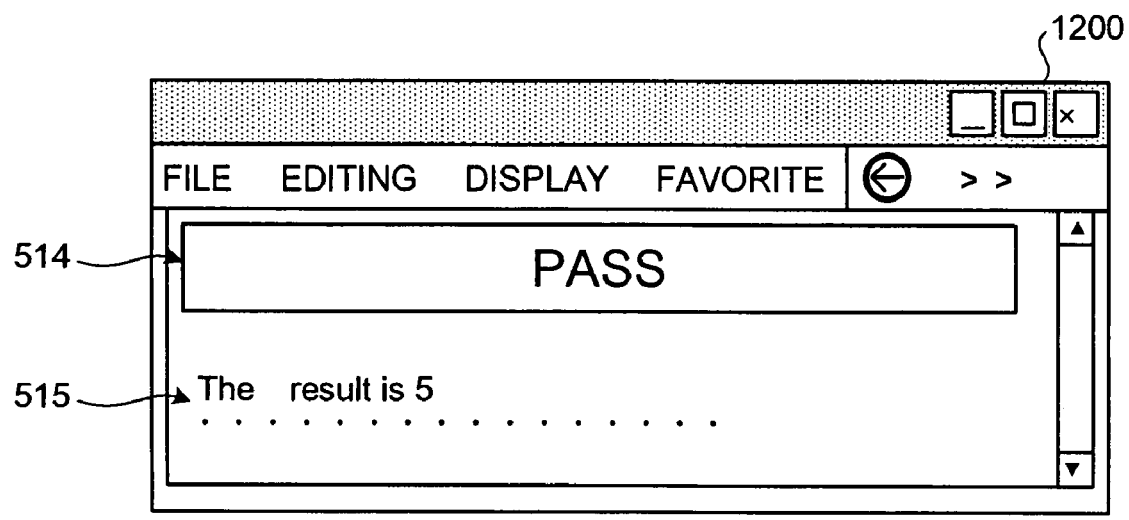
FIG. 12 is a schematic illustrating a display example of a screen display by a web browser.

FIG. 12 is an explanatory view of an instance of a screen display by the web browser 511 at step S810. Since an HTML comment is not appreciated at the web browser 511, the same screen (execution result 515) as in the case of the practical operation is displayed at the lower portion of the web browser 511. When a plurality of execution results 515 are present, a test result 514 may be displayed for each execution result 515. When test results 514 for a given number of execution results 515 are messages of "pass", a single message of "pass" may be displayed.

As a result, the tester can judge pass or fail only by confirming the test result 514 without visually checking screen items on the web browser 511 one by one. The tester is also allowed to quickly determine which screen item has failed by checking the position information.

In addition, according to the first embodiment, the proxy server 103 executes both proxy process original to the proxy server 103 and test process on the web application software 521. This enables reduction in the number of servers to introduce.

According to the above web server 102, the AP server 525 executes the aspect-attached JAVA class file 905 (binary file) to generate the test-information-attached response HTML 910, and sends the response HTML 910 to the proxy server 103. The test on the web application software, however, may be executed directly on the web server 102, like a common gateway interface (CGI) method.

According to the first embodiment, the test process on the web application 521 is made more efficient and check work on the test result 514 is facilitated simultaneously, thus the reliability of the test is improved.

According to the first embodiment, the web server 102 carries out the test information obtaining process and the aspect injecting process, and the proxy server 103 carries out the test process. In contrast, according to a second embodiment of the present invention, the web server 102 executes the meta-information obtaining process and the aspect injecting process, and the proxy server 103 executes the test process.

According to the second embodiment, the web server 102 is not provided with the test information obtaining engine 522, so that the web server 102 does not execute the process of obtaining an-expected value from the administrative server 104. The web server 102, therefore, does not generate the test-information-attached response HTML 910 but generates meta-information-attached response HTML, in which meta-information is embedded. In the following description of the second embodiment, the same components as described in the first embodiment will be denoted by the same reference numerals, and will not be explained further.

Figure 13:
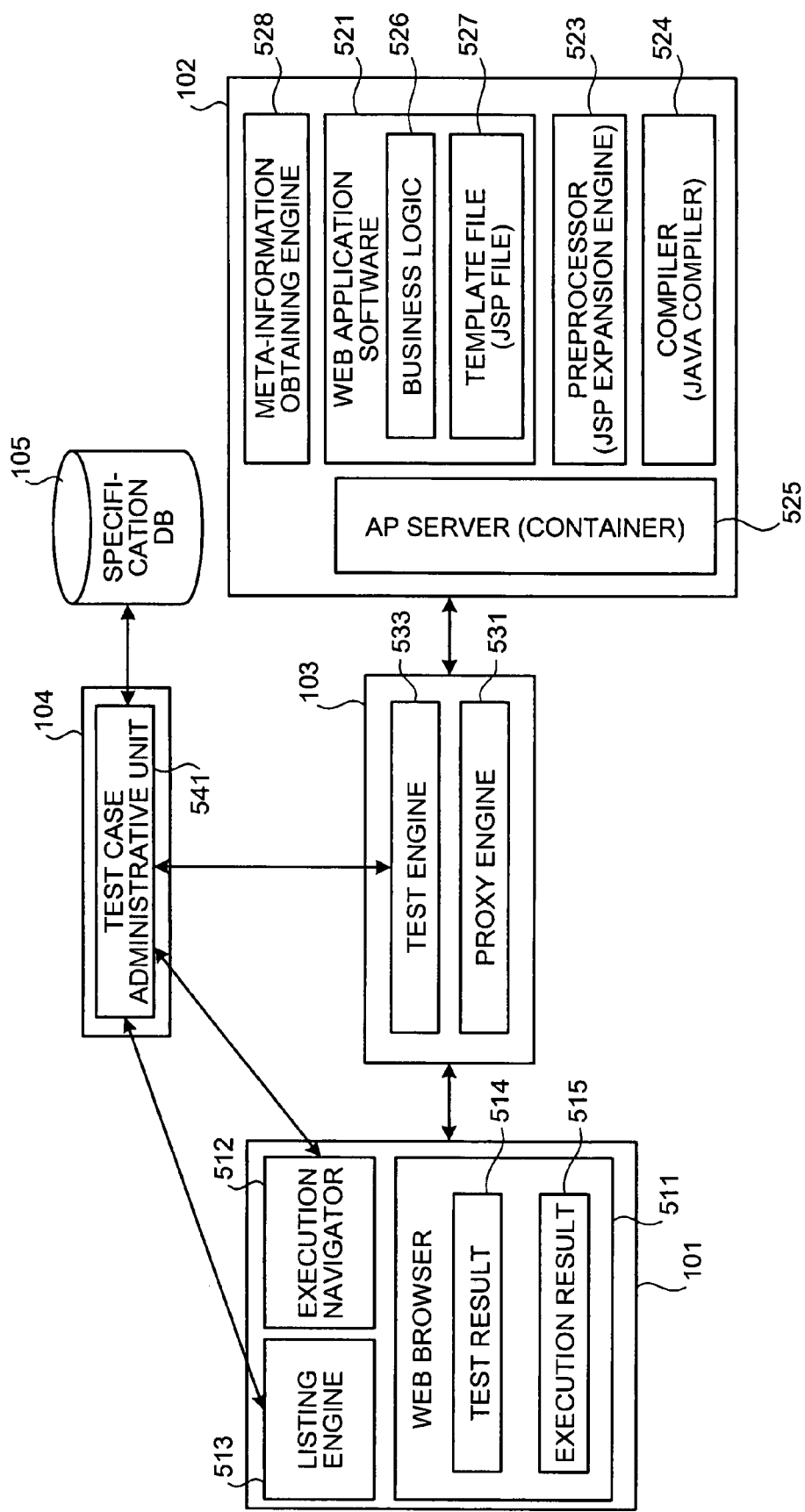
FIG. 13 is a block diagram of an internal configuration of each computer shown in FIG. 1 according to a second embodiment of the present invention.

FIG. 13 is a block diagram of the internal configuration of each computer shown in FIG. 1 according to the second embodiment. According to the second embodiment, a meta-information insertion engine 528 is installed in the web server 102 in replacement of the test information obtaining engine 522. The meta-information insertion engine 528 identifies meta-information consisting of the tag class 1001, the attribute value 1002 of the name attribute, and the attribute value 1003 of the property attribute from the Java source segment 903, as shown in (A) in FIG. 10. The meta-information insertion engine 528 then inserts the identified meta-information in a response HTML as a comment on the output item 701. The second embodiment does not require direct communication between the web server 102 and the administrative server 104.

A test engine 533, which is capable of communicating with the test case administrative unit 541 of the administrative server 104, is installed in the proxy server 103. The test engine 533 executes the same test process as the test engine 532 of the first embodiment does, being equivalent to the test engine 532 except for being capable of communicating with the test case administrative unit 541.

Figure 14:
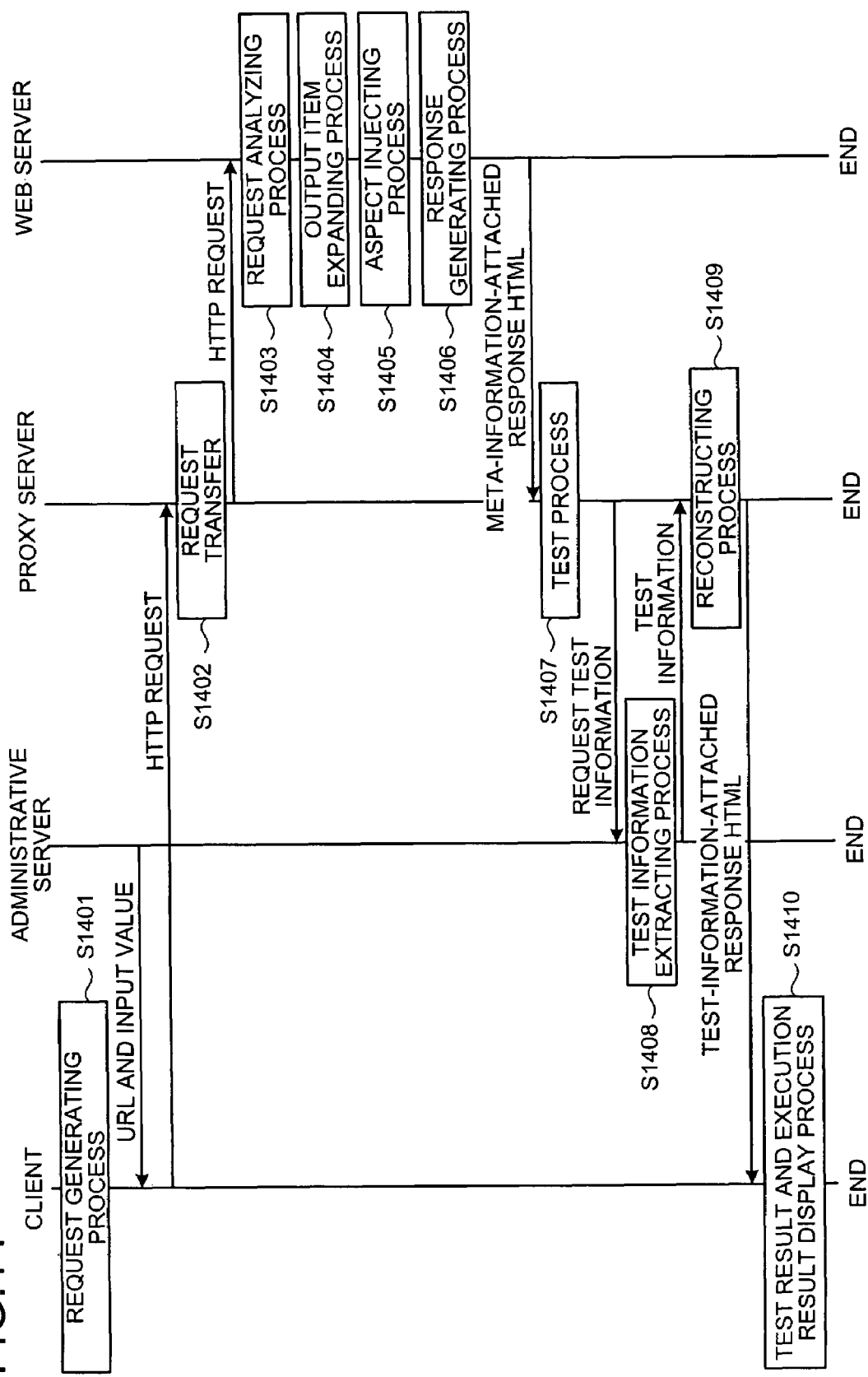
FIG. 14 is a sequence diagram of an execution process by the web server on testing according to the second embodiment.
Figure 15:
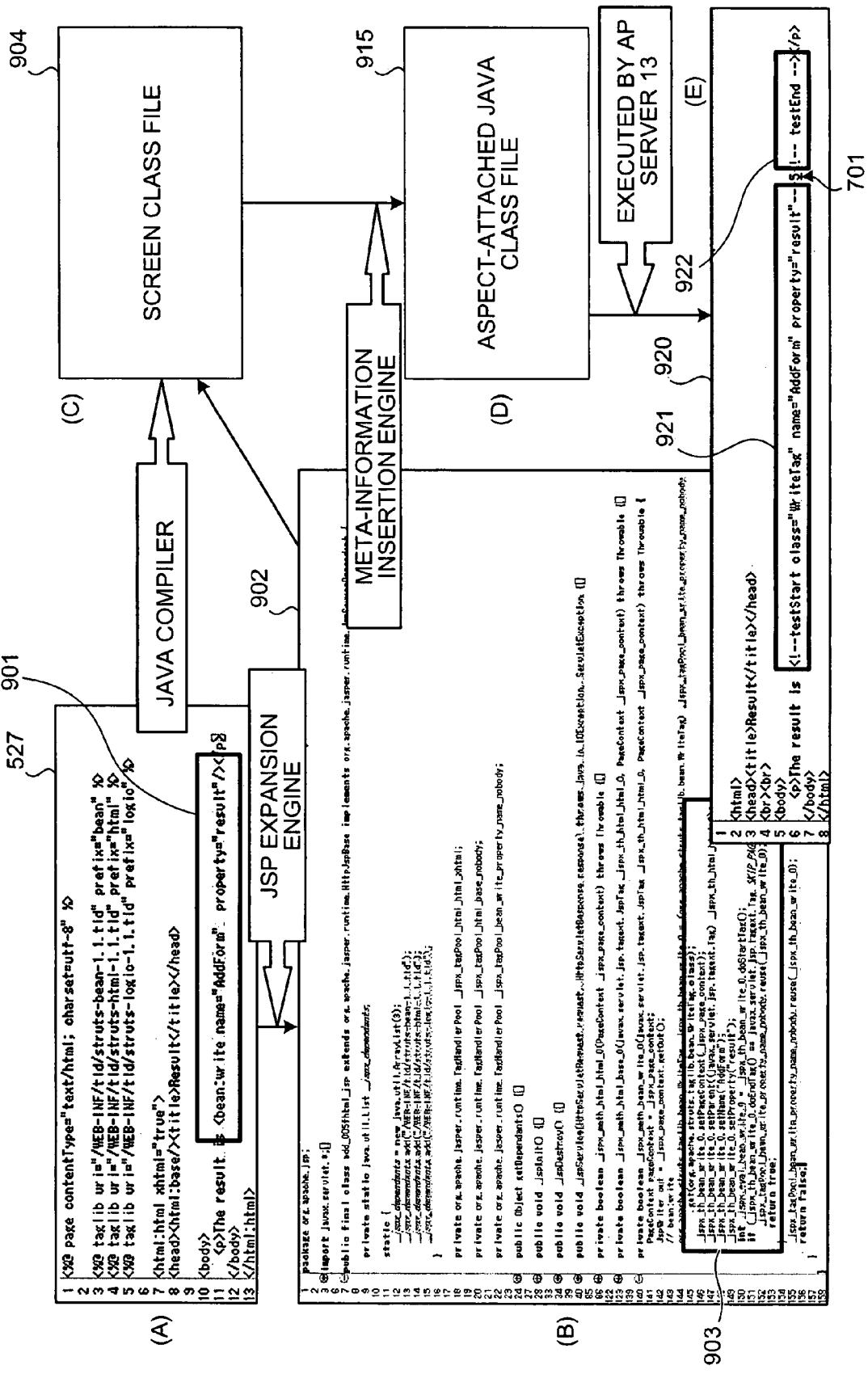
FIG. 15 is an explanatory view (1) of the execution process of the web server on testing according to the second embodiment.

The execution process contents of the web server 102 on testing according to the second embodiment will then be described for a working case where JAVA is applied. The execution process contents of the web server 102 on practical operation according to the second embodiment is the same as the first embodiment, and, therefore, will not be explained further. FIG. 14 is a sequence diagram of the execution process by the web server 102 on testing according to the second embodiment. FIGS. 15 and 16 are explanatory views of the execution process of the web server 102 on testing according to the second embodiment. During the test, a tester, not an ordinary user, operates the client 101.

The request generating process by the client 101 (step S1401), request transfer by the proxy server (step S1402), and the request analyzing process (step S1403) and output item expanding process (step S1404) by the web server 102 are the same as steps S801 to S804 of the first embodiment, and the test result and execution result display process (step S1410) is the same as step S810 of the first embodiment. The process flow of (A) to (C) in FIG. 15 is, therefore, the same as that of (A) to (C) in FIG. 9.

In FIG. 14, the web server 102 executes the aspect injecting process (step S1405) subsequent to the output item expanding process (step S1404). Specifically, the meta-information insertion engine 528 inserts meta-information into the screen class file 904 to obtain the aspect-attached JAVA class file 915, as shown in (D) in FIG. 15.

Following this, the web server 102 executes the response generating process (step S1406). Specifically, the AP server 525 executes the aspect-attached Java class file 915 to generate a meta-information-attached response HTML 920. In comparison with the response generated at the time of practical operation, the response HTML 920 shows a feature that it contains added HTML comments 921, 922. The web server 102 then sends the generated meta-information-attached response HTML 920 to the proxy server 103.

FIG. 16 depicts how the meta-information-attached response HTML 920 is generated as a result of replacement of an operation of the web application software 521 through the aspect-attached Java class file 915. When the meta-information insertion engine 528 is written in an aspect-oriented programming language, such as AspectJ, the meta-information insertion engine 528 and the AP server 525 generate the meta-information-attached response HTML 920 by the following procedures (1) to (5).

(1) Obtain the class name of the class to which the setPageContext( ) method of the Java source segment 903 belongs. In this example, "org.apache.struts.taglib.bean.WriteTag" written on 145th line in the Java source segment 903 shown in (B) in FIG. 15 and (A) in FIG. 16 is obtained as the tag class 1001 of the custom tag 901.

(2) Extract the tag class 1001 and the setXxx method in the Java source segment 903 as an attribute list. In this example, "AddForm" written on 148th line in the Java source segment 903 shown in (B) in FIG. 15 and (A) in FIG. 16 is extracted as the attribute value 1002 of the name attribute, and "result" written on 149th line is extracted as the attribute value 1003 of the property attribute.

(3) Output an HTML comment 1601, which is the meta-information formed into an HTML comment, just before calling of the doStartTag( ) method. As a result, "<!--testStart class="WriteTag" name="AddForm"property="result"-->" is displayed, as shown in (B) in FIG. 16.

(4) Execute the doStartTag( ) method and doEndTag( ) method to run the web application software 521 normally. As a result, an output value "5" is displayed as the output value 701 of the execution result 515, as shown in (B) in FIG. 16.

(5) Output an HTML comment 1602 just after the end of execution of doEndTag( ) method. As a result, "<!—testEnd-->" is displayed as shown in (B) in FIG. 16.

Figure 17:
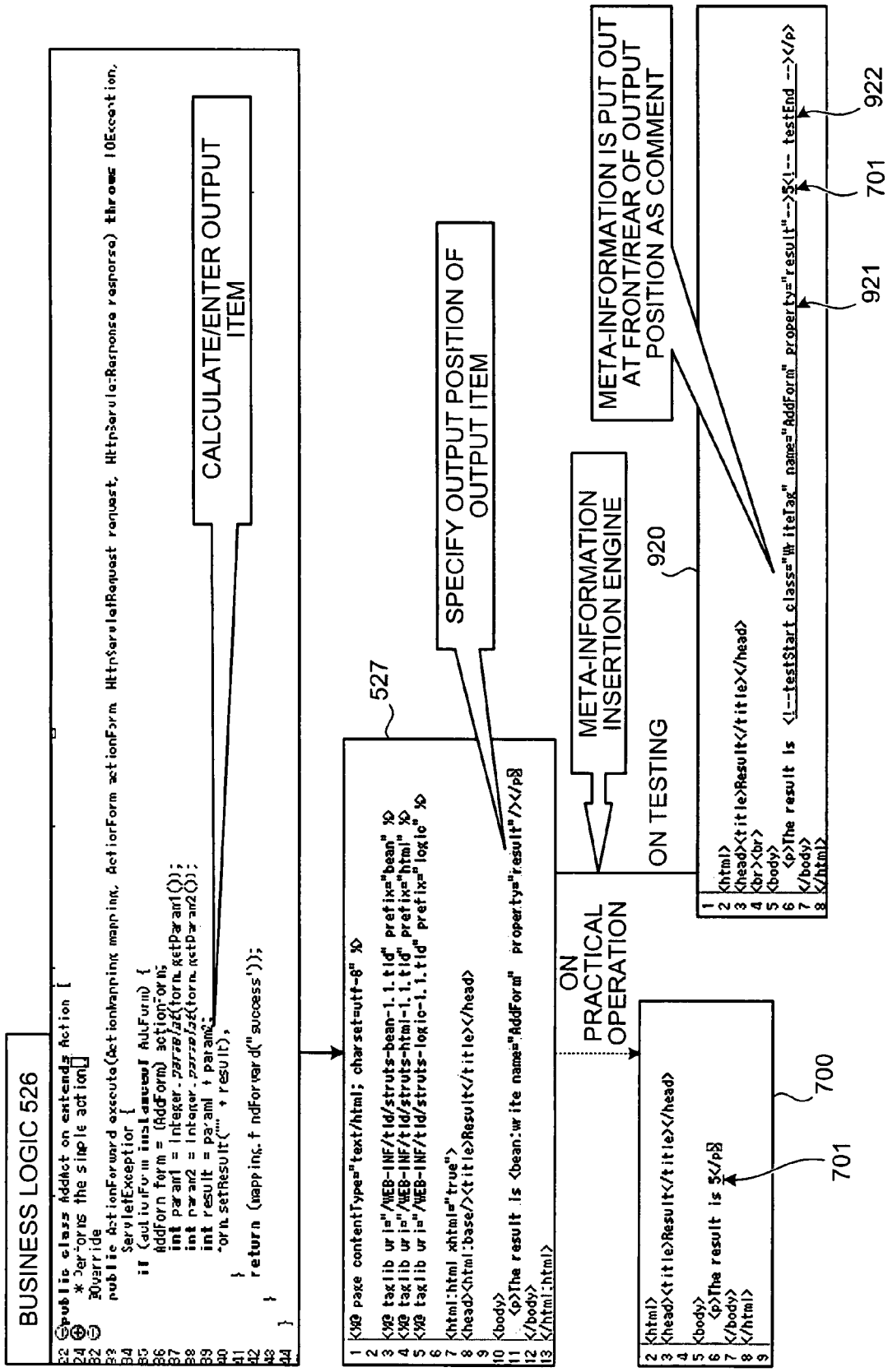
FIG. 17 is an explanatory view of an execution result from web application software according to the second embodiment.

FIG. 17 is an explanatory view of the execution result 515 from web application software 521 that is brought by the procedures (1) to (5). As shown in FIG. 17, in the meta-information-attached response HTML 920, the HTML comments 921, 922 indicating the meta-information are output to be located at the front and rear of the output position of the output value "5", which is the output item 701. Thus, the meta-information-attached response HTML 920, instead of the response HTML 700 generated at the time of practical operation, is returned to the proxy server 103.

Now, the description returns to the sequence shown in FIG. 14. The proxy server 103 executes the test process (step S1407). Specifically, the proxy engine 531 receives the meta-information-attached response HTML 920 sent from the web server 102, and delivers the response HTML 920 to the test engine 533, which executes a test on the meta-information-attached response HTML 920.

The test engine 533 scans the inside of the meta-information-attached response HTML 920, and searches the value of the part enclosed between "<!--testStart XXX-->" and "<!—testEnd-->". In "XXX", a character string as meta-information is described. The test engine 533 then determines a character string described in the part enclosed between those tags to be the output item 701 given as the execution result 515 from the web application software 521. The test engine 533 then removes the meta-information description XXX out of "<!--testStart XXX-->" to send the meta-information description XXX to the administrative server 104 as a test information request.

In response, the administrative server 104 executes a test information extracting process (step S1408). Specifically, the test case administrative unit 541 refers to the specification DB 105, extracts test information linked to the meta-information received by the test case administrative unit 541 from the specification DB 105, and sends the extracted test information back to the test engine 533.

The test engine 533 conducts a test on the output item 701 on the basis of the test information from the administrative server 104. For example, when an expected value is included in the test information, the test engine 533 determines on whether the expected value matches the output item 701. When matching fails (mismatching), the test engine 533 stores position information, such as the number of lines, digits, and the order of the output item 701 mismatching the expected value in the test-information-attached response HTML 910.

When a test condition is included in the test information, the test engine 533 takes the test condition into account upon conducting the test on the output item 701. For example, when the test condition included in the test information is "unchecked", the test engine 533 does not execute the test process.

When the test condition included in the test information is "exists", the test engine 533 tests to only check on whether any character string is present as the output item 701. The detail of the character string is not subjected to the test. When the test condition included in the test information is "format", the test engine 533 tests to only check format information of the character string as the output item 701. For example, the test is carried out on the output item 701 to see the presence/absence of a comma behind three digits or the number of decimal digits.

When the test condition included in the test information is "range", the test engine 533 tests to check the range of a numerical value represented by the character string as the output item 701. For example, a negative number is determined to be a failure in the test. When the test condition included in the test information is "length", the test engine 533 tests to check the range of the character string length of the output item 701.

The output item 701 can be an output item giving a different result for every execution of the test, such as a slip number. According to the present embodiment, the specification DB 105 is required to contain each expected value described for every type of the output item 701. The expected value for the output item 701 changing at every test, however, cannot be described.

To deal with such a problem, therefore, the above test conditions allow a clear statement that no test is conducted on an uncertain value changing at every test. In addition, the value presence test, the format test, and the range test allow execution of a test of the minimum requirement even on an uncertain value, which enables a more quality test.

Following the test process, the proxy server 103 executes the reconstructing process (step S1409). Specifically, the proxy engine 531 inserts an HTML comment 911 representing the test information into the meta-information-attached response HTML 920 in replacement of the HTML comment 921 representing the meta-information in the response HTML 920, and adds frame information as well. The frame information represents frames that divide the screen into an upper portion and a lower portion.

The test result 514 (pass/fail result and the position information of the failed output item 701 in response to a failure result) is added to the test-information-attached response HTML 910 as information displayed on the upper frame. The test-information-attached response HTML 910 containing the inserted HTML comment 911 representing the test information is added directly to the test-information-attached response HTML 910 as information displayed on the lower frame. The proxy server 103 sends the test-information-attached response HTML 910 reconstructed in the above manner to the client 101.

Subsequently, the client 101 receives the reconstructed test-information-attached response HTML 910 sent from the proxy server 103, and executes the process of displaying the test result and execution result from the web application software 521 (step S1410).

The above process of analyzing the meta-information-attached response HTML 920 and sending a result of an automatic test on the response HTML 920 to the tester brings the same effect as obtained in the first embodiment. According to the second embodiment, the detail of a tag at a failure detected spot can be obtained from a response. This allows informing the tester of more detailed failure information. In addition, the second embodiment eliminates a need of communication in an area of aspect. This leads to a simpler, more stable, and faster operation of the web application software 521.

Thus, the second embodiment makes the test process on the web application software 521 more efficient and facilitates check work on the test result 514 at the same time, thereby improving the reliability of the test.

Examples of modification of the above first and the second embodiments will be described. In the first and the second embodiments, the test engine 533 is installed in a server other than the web server 102 (e.g., proxy server 103). The test engine 533, however, may be installed in the web server 102.

This is made possible by, for example, monitoring HTML data sent out of the AP server 525, using a filter function of Servlet, or monitoring HTML data sent out of the web server 102, using an expanded function of the web server 102 through An Apache module, etc. In such a case, introduction of a new server for the test process is not necessary. This allows a reduction in the number of servers to be introduced and simplification of the test procedure as well.

A dedicated browser equipped with both web browser 511 and test engine 533 may be installed in the client 101. This enables flexible customization of a method for notifying of the test result 514. For example, the client 101 is provided with a test result notifying screen in addition to the browser screen, which improves user interface for a tester.

The test engine 533 may be incorporated into the web browser 511 in the client 101. For example, the web browser 511 is provided with a plug-in function, which allows a general-purpose browser like the web browser 511 to be service of executing the test process.

This enables flexible customization of a method for notifying of the test result 514. For example, the client 101 is provided with the test result notifying screen in addition to the browser screen, which improves user interface for a tester. Compared to the case of installment of the dedicated browser, this case makes easier the development of the test engine 533.

When the test engine 533 is incorporated into a general-purpose browser (the web browser 511) in the client 101, the test engine 533 may be given a function of testing an output file and a cash file from the general-purpose browser as the general-purpose browser is given a function of putting out the received response HTML 700 as a file. This facilitates the development of the test engine 533 that is applicable to any type of browser.

According to the first and the second embodiments, the screen class file 904 output by the JAVA compiler 524 is replaced with the aspect-attached JAVA class file 905 output by the test information obtaining engine 522 and with the aspect-attached JAVA class file 915 output by the meta-information insertion engine 528. This is a method that is taken to separate a practical operation execution environment from a test execution environment. Besides this method, the following methods (1) to (3) are available for environment separation.

(1) Using a dynamic aspect weaving process by a JAVA virtual machine.

(2) Expansion to a JAVA class loader.

(3) Constantly using the aspect-attached JAVA class files 905, 915. Reading an external define file, etc., in an aspect to determine on whether or not to insert test information or meta-information.

As described above, according to the web application testing program, the recording medium recording the program, the web application testing apparatus, and the web application testing method according to the present invention, the web application test process is made more efficient, and check work on a test result is facilitated simultaneously to improve the reliability of the test.

The web application testing method described in the present embodiment can be carried out by causing a computer, such as personal computer or work station, to execute a prepared program. This program is recorded on a computer-readable recording medium such as a hard disk, a flexible disk, a CD-ROM, an MO, and a DVD, and is executed as the computer reads the program out of the recording medium. The program may be a transmittable medium that can be distributed via a network, such as the Internet.

According to the embodiments described above, it is possible to improve reliability of the test.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a web application testing program causing a computer to execute:

receiving a request including an input value to be given to web application software installed in a web server;

executing the web application software by giving the input value to the web application software;

obtaining test information to be used in a test of an output item that is obtained by executing the web application software;

generating a response to the request, the response in which the test information is embedded in association with the output item; and transmitting the response to a computer that executes the test of the output item.

2. The computer-readable recording medium according to claim 1, wherein the obtaining includes obtaining, when the output item is a fixed value, an expected value written in a specification of the web application software, as the test information.

3. The computer-readable recording medium according to claim 1, wherein the obtaining includes obtaining, when the output item is a non-fixed value, a test condition for the output item, as the test information.

4. The computer-readable recording medium according to claim 3, wherein the test condition includes information indicating that the test of the output item is not executed.

5. The computer-readable recording medium according to claim 3, wherein the test condition includes information on presence or absence of the output item.

6. The computer-readable recording medium according to claim 3, wherein the test condition includes information to limit a format of the output item.

7. The computer-readable recording medium according to claim 3, wherein when the output item is a numerical value, the test condition includes information to limit a range of the numerical value.

8. The computer-readable recording medium according to claim 3, wherein when the output item is a character string, the test condition includes information to limit length of the character string.

9. A computer-readable recording medium that stores therein a web application testing program causing a computer to execute:

receiving a response to a request when web application software installed in a web server is executed in response to the request, the response in which an output item obtained by execution of the web application software is associated with test information to be used in a test of the output item;

testing the output item based on the test information in the response; and outputting a result obtained as a result of the testing in association with the output item.

10. The computer-readable recording medium according to claim 9, wherein the testing includes testing the output item, when the test information is an expected value written in a specification of the web application software, by determining whether the output item matches the expected value, and the outputting includes outputting, a message indicating "pass" when the output item matches the expected value, and outputting a message indicating "fail" when the output item does not match the expected value, as the result.

11. The computer-readable recording medium according to claim 9, wherein the testing includes testing the output item, when the test information is a test condition for the output item written in a specification of the web application software, by determining whether an output value representing the output item conforms with the test condition, and the outputting includes outputting a message indicating "pass" when the output value conforms to the test condition, and outputting a message indicating "fail" when the output value fails to conform to the test condition, as the result.

12. The computer-readable recording medium according to claim 9, wherein the outputting includes outputting the result in association with the output item by displaying on a display screen.

13. The computer-readable recording medium according to claim 9, wherein the web application testing program further causes the computer to execute:

reconstructing the response into a second response in which the result is associated with the output item; and transmitting the second response to a computer that has transmitted the request.

14. A computer-readable recording medium that stores therein a web application testing program causing a computer to execute:

receiving a response to a request when web application software installed in a web server is executed in response to a request, the response in which an output item obtained by executing the web application software with meta-information on execution of the web application software;

obtaining test information associated with the meta-information in the response from a group of test information, each piece of which is associated with meta-information on each execution of the web application software;

testing the output item in the response based on the obtained test information; and outputting a result obtained as a result of the testing, in association with the output item.

15. The computer-readable recording medium according to claim 14, wherein the obtaining includes obtaining, when the output item is a fixed value, an expected value written in a specification of the web application software, as the test information.

16. The computer-readable recording medium according to claim 14, wherein the obtaining includes obtaining, when the output item is an uncertain value, a test condition for the output item as the test information.

17. The computer-readable recording medium according to claim 14, wherein the outputting includes outputting the result in association with the output item by displaying on a display screen.

18. A computer-readable recording medium that stores therein a web application testing program causing a computer to execute:

receiving a response to a request when web application software installed in a web server is executed in response to a request, the response in which an output item obtained by executing the web application software with meta-information on execution of the web application software;

obtaining test information associated with the meta-information in the response from a group of test information, each piece of which is associated with meta-information on each execution of the web application software;

testing the output item in the response based on the obtained test information; and outputting a result in which the test information is associated with the output item by displaying on a display screen.

19. The computer-readable recording medium according to claim 14, wherein the web application testing program further causes the computer to execute:

reconstructing the response into a second response in which the result is associated with the output item; and transmitting the second response to a computer that has transmitted the request.

20. The computer-readable recording medium according to claim 14, wherein the web application testing program further causes the computer to execute:

reconstructing the response into a second response in which the inspection information is associated with the output item; and transmitting the second response to a computer that has transmitted the request.

* * * * *